US011119930B2

(12) United States Patent
Kamikubo et al.

(10) Patent No.: US 11,119,930 B2
(45) Date of Patent: Sep. 14, 2021

(54) ARITHMETIC PROCESSING APPARATUS AND CONTROL METHOD FOR ARITHMETIC PROCESSING APPARATUS

(71) Applicant: FUJITSU LIMITED, Kawasaki (JP)

(72) Inventors: Yuki Kamikubo, Yokohama (JP); Yasuharu Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 240 days.

(21) Appl. No.: 16/430,487

(22) Filed: Jun. 4, 2019

(65) Prior Publication Data

US 2019/0377677 A1   Dec. 12, 2019

(30) Foreign Application Priority Data

Jun. 6, 2018 (JP) .............................. JP2018-108952

(51) Int. Cl.
*G06F 12/084* (2016.01)
*G06F 12/0862* (2016.01)
(Continued)

(52) U.S. Cl.
CPC ........ *G06F 12/084* (2013.01); *G06F 9/30058* (2013.01); *G06F 12/0811* (2013.01); *G06F 12/0862* (2013.01); *G06F 12/0875* (2013.01)

(58) Field of Classification Search
CPC ................ G06F 8/458; G06F 9/30058; G06F 9/466–467; G06F 9/52–528;
(Continued)

(56) References Cited

U.S. PATENT DOCUMENTS

2006/0026594 A1* 2/2006 Yoshida .............. G06F 12/0859
718/100
2007/0005895 A1   1/2007 Fujisaki et al.
(Continued)

FOREIGN PATENT DOCUMENTS

JP    2007-11689      1/2007
JP    2007-334564    12/2007
WO    2005/103908    11/2005

OTHER PUBLICATIONS

Jann Horn, "Reading privileged memory with a side-channel", [online], [searched on May 9, 2018], Project Zero, internet <https://googleprojectzero.blogspot.jp/2018/01/reading-privileged-memory-with-side.html?m=1> (51 pages).

*Primary Examiner* — Nicholas J Simonetti
(74) *Attorney, Agent, or Firm* — Fujitsu Patent Center

(57) ABSTRACT

An apparatus includes an instruction issuer that issues an instruction; and a cache including a cache data memory and a cache tag including cache entries, and a cache controller configured to perform cache-hit judgement, in response to a memory-access instruction issued from the instruction issuer, based on an address of the memory-access instruction and configured to issue a memory-access request to a memory in a case where the cache-hit judgement is a cache miss, wherein the cache controller registers, when issuing the memory-access request, data obtained by the memory-access request in the cache data memory, and registers provisional registration information of a provisional registration state indicating that cache registration is performed by execution of a speculative memory-access instruction in the cache tag, and judges as a speculative entry cache miss and issues the memory-access request.

12 Claims, 27 Drawing Sheets

(51) Int. Cl.
*G06F 12/0811* (2016.01)
*G06F 12/0875* (2016.01)
*G06F 9/30* (2018.01)

(58) Field of Classification Search
CPC ............. G06F 11/1474; G06F 12/0828; G06F 16/1865; G06F 2201/87; G06F 2221/0795; G06F 12/08–0897
See application file for complete search history.

(56) References Cited

U.S. PATENT DOCUMENTS

| | | |
|---|---|---|
| 2007/0237326 A1 | 10/2007 | Nonaka et al. |
| 2007/0294487 A1 | 12/2007 | Mino et al. |
| 2010/0017580 A1* | 1/2010 | Greenhalgh ........ G06F 9/30167 712/205 |
| 2010/0095091 A1* | 4/2010 | Asanaka ............... G06F 9/3836 712/208 |

\* cited by examiner

FIG. 18

| | VALID | CORE0:SP_EN_FLG_0 | CORE0:IID_0 | CORE0:SP_EN_FLG_1 | CORE1:IID_1 |
|---|---|---|---|---|---|
| STATE_0 L2$_TAG | 0 | 0 | -- | 0 | -- |
| STATE_1 L2$_TAG | 1 | 1 | 0xA | 1 | 0xB |

L2 CACHE IS Valid, L2 CACHE HIT OCCURS.
CORE 1 SPECULATIVE ENTRY FLAG=1
⇒ CORE 1 IS SPECULATIVE ENTRY, IN THE CASE OF FIG. 9, SPECULATIVE ENTRY CACHE MISS OCCURS.
⇒ CORE 1 IS SPECULATIVE ENTRY, BRANCH IIDS ARE COMPARED IN THE CASE OF FIG. 12, SPECULATIVE ENTRY CACHE HIT JUDGEMENT IS PERFORMED. ⟵ S43 ⇒S43

| | VALID | CORE0:SP_EN_FLG_0 | CORE0:IID_0 | CORE1:SP_EN_FLG_1 | CORE1:IID_1 |
|---|---|---|---|---|---|
| STATE_2 L2$_TAG | 1 | 0 | -- | 1 | 0xB |
| STATE_3 L2$_TAG | 1 | 1 | 0xA | 0 | -- |

L2 CACHE IS Valid, L2 CACHE HIT OCCURS.
CORE 1 SPECULATIVE ENTRY FLAG=0
ALL CORES SPECULATIVE ACCESS FLAGS OR=1
⇒ SINCE CORE 1 DOES NOT HAVE SPECULATIVE REGISTRATION (NON-REGISTRATION), SPECULATIVE ENTRY CACHE MISS OCCURS. ⟵ S45

| | VALID | CORE0:SP_EN_FLG_0 | CORE0:IID_0 | CORE1:SP_EN_FLG_1 | CORE1:IID_1 |
|---|---|---|---|---|---|
| STATE_4 L2$_TAG | 1 | 0 | -- | 0 | -- |

L2 CACHE IS Valid, L2 CACHE HIT OCCURS.
CORE 1 SPECULATIVE ENTRY FLAG=0
ALL CORES SPECULATIVE ACCESS FLAGS OR=0
⇒ L2 CACHE IS FORMALLY REGISTERED, SPECULATIVE ENTRY CACHE HIT OCCURS. ⟵ S46

D. AFTER B, NON-SPECULATIVE LOAD4 IS ISSUED BY CORE 0. WHEN L2 OF CORE 0 IS FORMALLY REGISTERED, L2 OF CORE 1 IS ALSO FORMALLY REGISTERED. L1 OF CORE 0 IS THEN FORMALLY REGISTERED.

ARITHMETIC PROCESSING APPARATUS AND CONTROL METHOD FOR ARITHMETIC PROCESSING APPARATUS

CROSS-REFERENCE TO RELATED APPLICATION

This application is based upon and claims the benefit of priority of the prior Japanese Patent Application No. 2018-108952, filed on Jun. 6, 2018, the entire contents of which are incorporated herein by reference.

FIELD

The embodiment discussed herein is related to an arithmetic processing apparatus and a control method for the arithmetic processing apparatus.

BACKGROUND

An arithmetic processing apparatus is a processor or a central processing unit (CPU) chip. Hereinafter, the arithmetic processing apparatus is referred to as a processor. The processor has various characteristics on configuration or control in order to efficiently execute instructions of a program. Examples include a configuration in which an instruction of a branch prediction destination is speculatively executed before a branch condition of a branch instruction is determined, a configuration in which instructions are executed by out-of-order which is not a program order, and the like.

On the other hand, the processor has a privileged mode or an OS mode (kernel mode) for executing a program of an operating system (OS) in addition to a user mode for executing a user program. A protected memory area is enabled to be accessed only in the privileged mode, an access of instruction in the user mode is prohibited. When the instruction in the user mode tries to access the above-described protected memory area, the processor detects an unauthorized memory access, traps execution of the instruction, and cancels the execution of the instruction. Having the configuration as described above makes it possible to suppress data in the protected memory area from being accessed in an unauthorized manner.

Speculative execution, cache memory control, or the like of the processor is described in the following patent literatures.

Japanese Laid-open Patent Publication No. 2007-11689, Japanese Laid-open Patent Publication No. 2007-334564, and International Publication Pamphlet No. WO 2005/103908 are examples of related art.

Jann Horn, "Reading privileged memory with a side-channel", [online], [searched on May 9, 2018], internet <https://googleprojectzero.blogspot.jp/2018/01/reading-privileged-memory-with-side.html?m=1> is an example of related art.

SUMMARY

According to an aspect of the embodiments, an arithmetic processing apparatus includes an instruction issuer configured to issue an instruction; and a cache including a cache data memory and a cache tag including a plurality of cache entries, and a cache controller configured to perform cache hit judgement, in response to a memory access instruction issued from the instruction issuer, based on an address of the memory access instruction and configured to issue a memory access request to a memory in a case where the cache hit judgement is a cache miss, wherein the cache controller registers, in response to a speculative first memory access instruction which is issued from the instruction issuer and to which a speculative access flag indicating speculative execution and an identification (IID) of a branch instruction are added, when issuing the memory access request, data obtained by the memory access request in the cache data memory, and registers, based on the speculative execution of the speculative access flag added to the speculative first memory access instruction, provisional registration information of a provisional registration state indicating that cache registration is performed by execution of a speculative memory access instruction in the cache tag, and in response to a second memory access instruction issued after the speculative first memory access instruction, to a same address as an address of the speculative first memory access instruction, in a case where the provisional registration information of an entry in the cache tag for which a cache hit occurs has the provisional registration state, judges as a speculative entry cache miss and issues the memory access request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 is a diagram illustrating the speculative entry cache hit judgement in various types of L2 cache tag states in a case where a data registration request is issued by a memory access instruction speculatively executed from a core 1.

DESCRIPTION OF EMBODIMENTS

For example, there is a risk that, before a branch condition of a branch instruction is determined, a load instruction which is added in a program in an unauthorized manner is speculatively executed, and a secret value in a protected memory area is read. A load instruction then being speculatively executed using the secret value as an address may be considered.

In the above-described case, in a case where a cache memory is initially flushed, by the execution of the second load instruction using the secret value as the address, data read from the memory are registered in a cache line in the cache memory having the secret value as the address, and other cache lines remain in a unregistered state of the data. After the branch condition of the branch instruction is determined, when a load instruction is executed while scanning the addresses and each latency is measured, the latency of the load instruction having the secret value as the address becomes shorter than those of the other addresses. As a result, it is possible to obtain the secret value in an unauthorized manner.

In order to avoid the vulnerability of the processor as described above, for example, suppressing a memory access instruction (load instruction) which is speculatively executed while a branch destination of the branch instruction is not determined may be considered.

However, when the speculative execution of the memory access instruction of the branch prediction destination is suppressed while the branch destination is not determined, in a case where a long time is required until the branch determination, speculative execution of a memory access instruction which is not unauthorized instruction is also suppressed, which leads significant performance deterioration of the processor.

Figure 1:
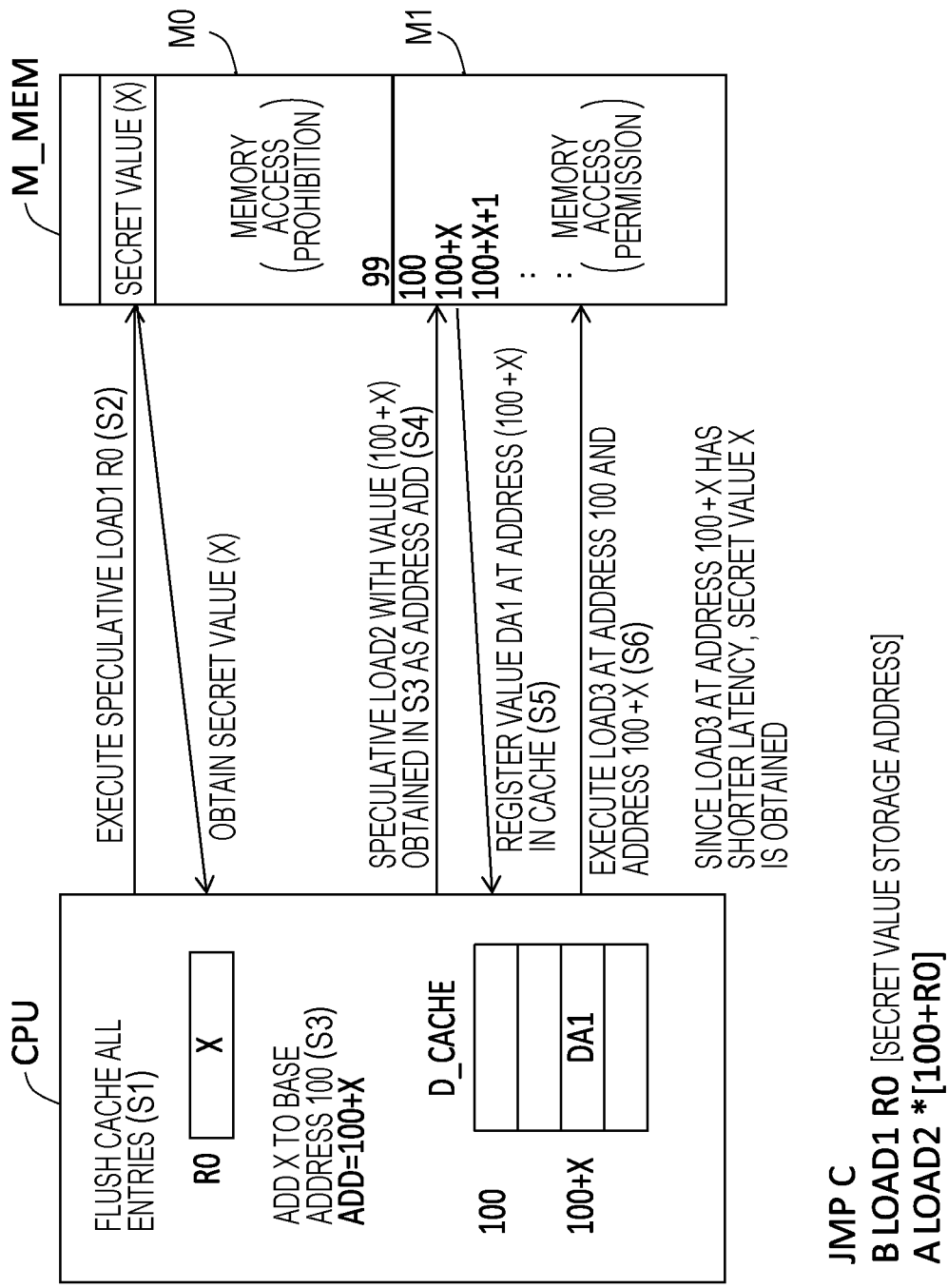
FIG. 1 is a diagram describing an example of vulnerability of a processor.

FIG. 1 is a diagram describing an example of vulnerability of a processor. FIG. 1 illustrates a processor CPU and a main memory M_MEM. FIG. 1 also illustrates an example of an instruction string executed by the processor CPU This example of the instruction string is one example of an unauthorized program, contents of each of the instructions are as follows.

JMP C//a branch instruction for branch to a branch destination C//
B LOAD1 R0 [secret value storage address]//loading by the address to which a secret value is stored and storing the secret value in a register R0//
A LOAD2*[100+R0]//loading is performed by an address (secret value) in the register R0//

To the above-described instruction string, unauthorized load instructions "LOAD1" and "LOAD2" are added. The unauthorized program initially clears a cache memory (S1), and performs transition to a privileged mode (OS mode). The processor executes the branch instruction JMP C in the privileged mode, but before the branch destination C of the branch instruction is determined, speculatively executes (performs speculative execution of) the load instruction LOAD1 of the branch prediction destination B (S2). This branch prediction destination B is registered as branch prediction information in an unauthorized manner, a correct branch destination of the branch instruction is assumed to be C.

When the processor speculatively executes this load instruction LOAD1 of the incorrect branch prediction destination B (S2), a secret value X in a protected memory area M0 to which only an access in the privileged mode is permitted is read and stored in the register R0. Furthermore, the secret value X is added to a head address "100" of an access permission area M1 (S3), the next load instruction A LOAD2 is speculatively executed, and then the load instruction LOAD2 with respect to an address 100+X obtained by adding the secret value X in the register R0 to the head address [100] reads data DA1 at the address 100+X in the memory area M1 to which an access in a user mode is permitted (S4). As a result, the data DA1 are registered in an entry of the address 100+X in a cache memory CACHE of the processor (S5).

Thereafter, the processor repeats a load instruction LOAD3, while changing the address (S6), access latency of the load instruction to the address 100+X in which the data DA1 are registered becomes shorter than that of another address 100, and it is possible to know the content of the address 100+X. With this, security of the secret value X is lowered. This load instruction LOAD3 may be speculatively executed, or may be non-speculatively executed.

After the two load instructions LOAD1 and LOAD2 are speculatively executed, when the execution of the branch instruction JMP C is completed and the branch destination is determined, it is found that the branch prediction destination B is obtained by branch misprediction. As a result, the load instructions LOAD1 and LOAD2 which are speculatively executed in a pipeline circuit in the processor are cleared, the contents of the register R0 (since the instruction is not completed in the speculative execution, the register R0 is a renaming register) are cleared. However, since the cache memory is not cleared, it is possible to obtain the secret value X based on the latency of the cache memory.

As described above, before the branch destination of the branch instruction JMP is determined, the load instructions LOAD1 and LOAD2 to the incorrect branch prediction destinations being executed and a cache registration state by the LOAD2 being maintained are one of the causes of the vulnerability of the processor.

Processor and Information Processing Apparatus of Present Embodiment

Figure 2:
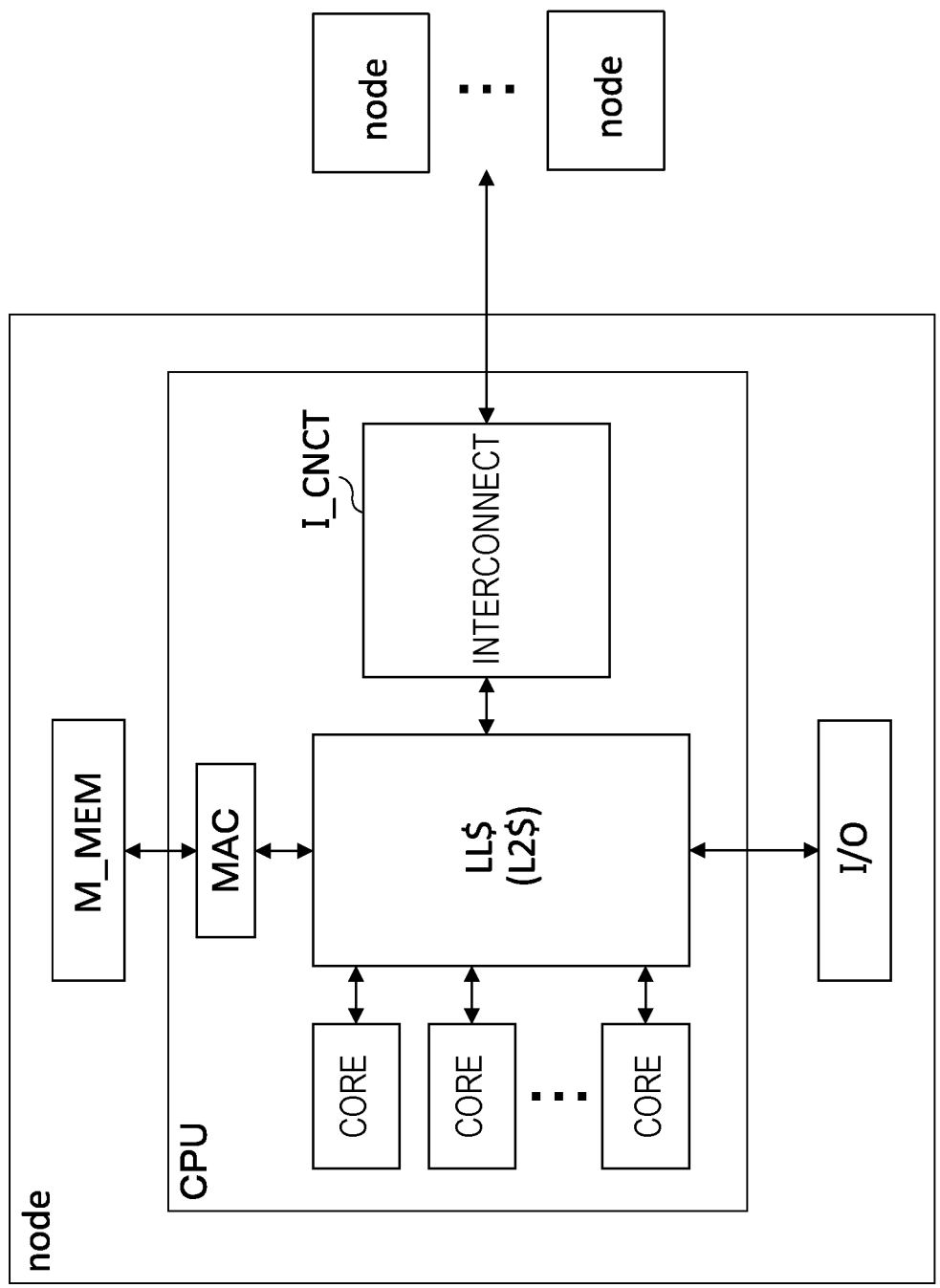
FIG. 2 is a schematic diagram of an information processing apparatus on which a processor of the present embodiment is mounted.

FIG. 2 is a schematic diagram of an information processing apparatus on which a processor of the present embodiment is mounted. An information processing apparatus, a high performance computer (HPC), or a supercomputer has a processor central processing unit (CPU), a main memory M_MEM, and an input and output section I/O in each of a plurality of nodes. The processors CPU in the respective nodes perform packet communication with one another through an interconnect provided in each processor.

The processor CPU which is an arithmetic processing apparatus includes a plurality of cores CORE_0 to CORE_n, a last level cache LL$ which is shared by the plurality of cores, a memory access controller MAC for controlling an access to the memory, and an interconnect I_CNCT for controlling the packet communication with the processors of the other nodes. Each core CORE includes an instruction issuing device, an arithmetic device, and an L1 cache, which will be described later. The instruction issuing device may be called an instruction issuer. The instruction issuer may be a circuit such as a field-programmable gate array (FPGA). The last level cache LL$ in FIG. 2 is, in an example of the following embodiment, taken as a secondary cache, a second level cache, or an L2 cache.

Figure 3:
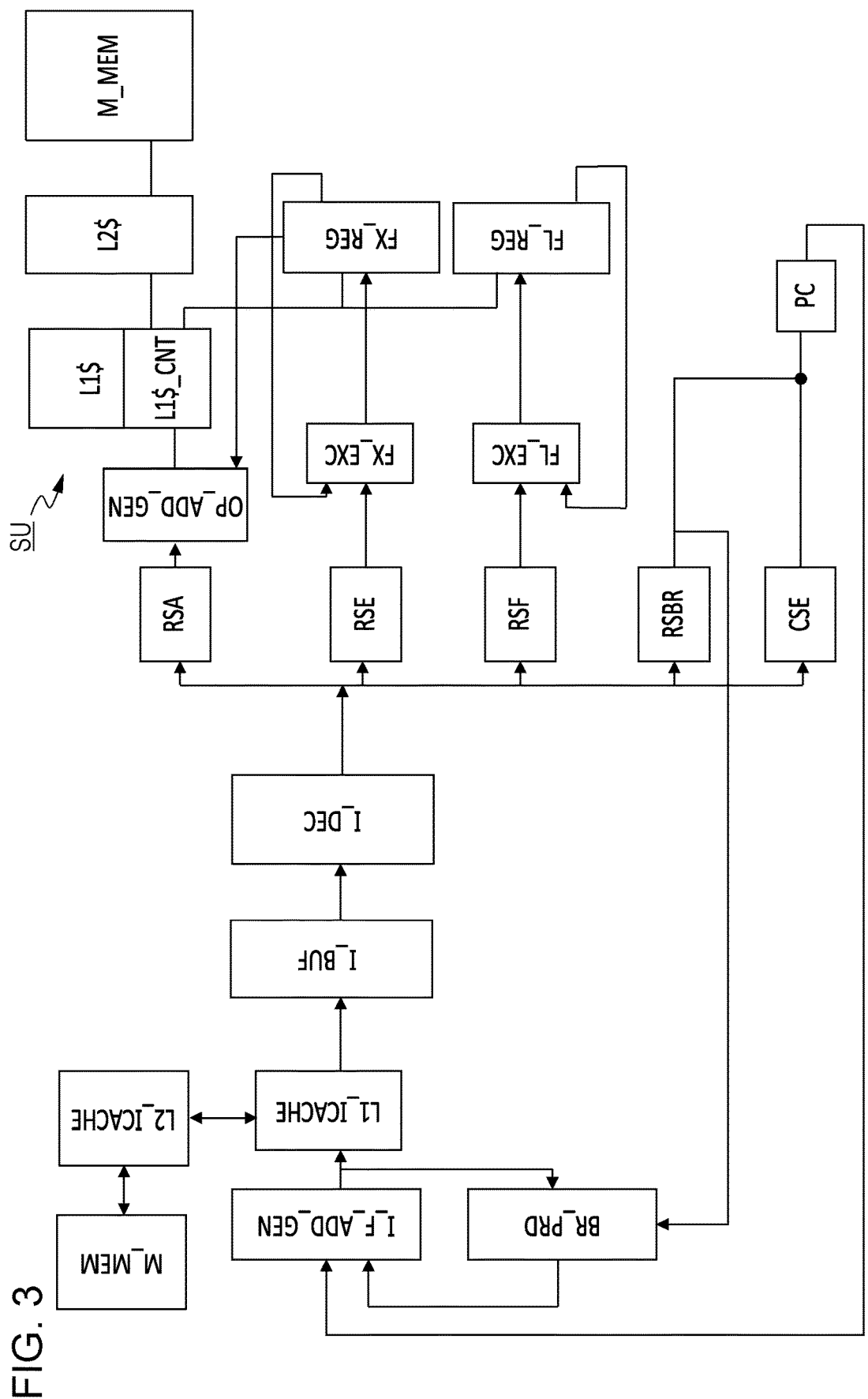
FIG. 3 is a diagram illustrating a configuration example of the processor according to the present embodiment.

FIG. 3 is a diagram illustrating a configuration example of the processor according to the present embodiment. The processor in FIG. 3 includes, as the instruction issuing device, an instruction fetch address generator I_F_ADD_GEN, an L1 instruction cache L1_ICACHE, an L2 instruction cache L2_ICACHE, an instruction buffer I_BUF, an instruction decoder I_DEC, and reservation stations RSA, RSE, and RSF which are instruction issuing devices for issuing a plurality of instructions to the arithmetic device. The instruction issuing device includes a branch instruction reservation station RSBR and a commit stack entry CSE.

The processor further includes, as a plurality of arithmetic devices, a storage unit SU, a fixed-point arithmetic device FX_EXC, and a floating-point arithmetic device FX_EXC. One or a plurality of arithmetic devices is included for each of these arithmetic devices.

The storage unit SU includes an operand address generator OP_ADD_GEN including an addition and subtraction circuit for address calculation and a primary data cache L1_DCACHE. The primary data cache includes, in addition to a cache memory, an L1 cache controller L1$_CNT for controlling the cache memory.

The fixed-point arithmetic device FX_EXC and the floating-point arithmetic device FL_EXC each include, for example, an addition and subtraction circuit, a logic arithmetic device, a multiplier, and the like. The floating-point arithmetic device includes, for example, so as to be capable of performing single instruction multiple data (SIMD) operation, arithmetic devices of the number corresponding to an SIMD width. The processor includes a fixed-point register file FX_REG and a floating-point register file FL_REG for storing processing results of these arithmetic devices. These register files include a plurality of registers, and partially includes a renaming register in which the processing result is stored before instruction completion and an architecture register in which the processing result is stored at the time of instruction completion. The architecture register is a register accessible from software, and is a versatile register.

The configuration of the core in the processor has been described above. The processor further includes an L2 cache L2$ which is shared by the plurality of cores, which is connected to the main memory M_MEM via a memory controller which is not illustrated. The L2 instruction cache L2_ICACHE is also connected to the main memory M_MEM via the memory controller. The L2 cache L2$ is the above-described last level cache.

An overall configuration of the processor will be described below along a processing flow of the instruction. The instruction fetch address generator I_F_ADD_GEN generates a fetch address, in execution order in a program (in order), fetch instructions from the primary instruction cache L1_ICACHE are temporarily stored in the instruction buffer I_BUF. The instruction decoder I_DEC receives the fetch instructions in the instruction buffer in order, decodes them, and generates executable instructions (execution instructions) to which information required for execution is added.

Next, the execution instructions generated by the instruction decoder are queued in order in a storage, which is referred to as a reservation station, having a queue structure. The reservation station is an execution queue in which the execution instructions are accumulated in the queue, and is provided for each arithmetic device for executing the instructions.

The reservation station includes, for example, the reservation station for address generation (RSA) provided for the storage unit SU including an L1 data cache L1$, the Reservation Station for Execution (RSE) provided in the fixed-point arithmetic device FX_EXC, and the Reservation Station for Floating point (RSF) provided in the floating-point arithmetic device FL_EXC. The Reservation Station for Branch (RSBR) corresponding to a branch prediction unit BR_PRD is further included.

Hereinafter, the reservation station is appropriately abbreviated as an RS.

The execution instructions queued in each RS are issued to the arithmetic device and executed by the arithmetic device in random order (out of order), from an instruction whose execution condition is satisfied, such as whether or not an input operand required for the instruction execution may be read from the versatile register file by completion processing of the arithmetic processing of a preceding instruction (whether or not a read-after-write (RAW) restriction is satisfied), whether or not circuit resources of the arithmetic device may be used, or the like.

On the other hand, the instruction decoder I_DEC assigns instruction identifications (IIDs) to the execution instructions generated by the decoding of the fetch instructions, respectively, in execution order in the program, and transmits the execution instruction to the commit stack entry CSE (hereinafter, referred to as CSE) in order. The CSE includes a storage for storing the transmitted execution instructions in order having a queue structure, and an instruction commit processing unit which performs commit processing (completion processing) of each of the instructions in response to a processing completion report of the instruction from the pipeline circuit in the arithmetic device based on information and the like in the queue. Accordingly, the CSE is a completion processing circuit (completion processing section) which performs the completion processing of the instruction.

The execution instructions are stored in the queue in the CSE in order, and waits the processing completion report of the instruction from each arithmetic device. As described above, the execution instructions are transmitted from each RS to the arithmetic device out of order, and executed by the arithmetic device. Thereafter, when the processing completion report of the instruction is transmitted to the CSE, the instruction commit processing unit of the CSE performs completion processing on the execution instruction corresponding to the processing completion report among the instructions waiting the processing completion report stored in the queue in order, and updates the circuit resources such as the register and the like. The CSE increments a program counter PC in the completion processing.

The branch instruction queued in the RSBR for branch processing is subjected to branch prediction by the branch prediction unit BR_PRD, and the instruction fetch address generator I_F_ADD_GEN generates a branch destination address based on a prediction result. As a result, an instruction based on the branch prediction is read from the instruction cache, passes through the instruction buffer and the instruction decoder, and speculatively executed by the arithmetic device. The RSBR executes the branch instructions in order. Note that before determination of the branch destination of the branch instruction, predicting the branch destination and speculatively executing an instruction of the predicted branch destination are performed. When the branch prediction is correct, processing efficiency is improved, but when the branch prediction is not correct, the speculatively executed instruction is cancelled in the pipeline and the processing efficiency deteriorates.

Schematic Configuration and Operation of L1 Cache Controller

Figure 4:
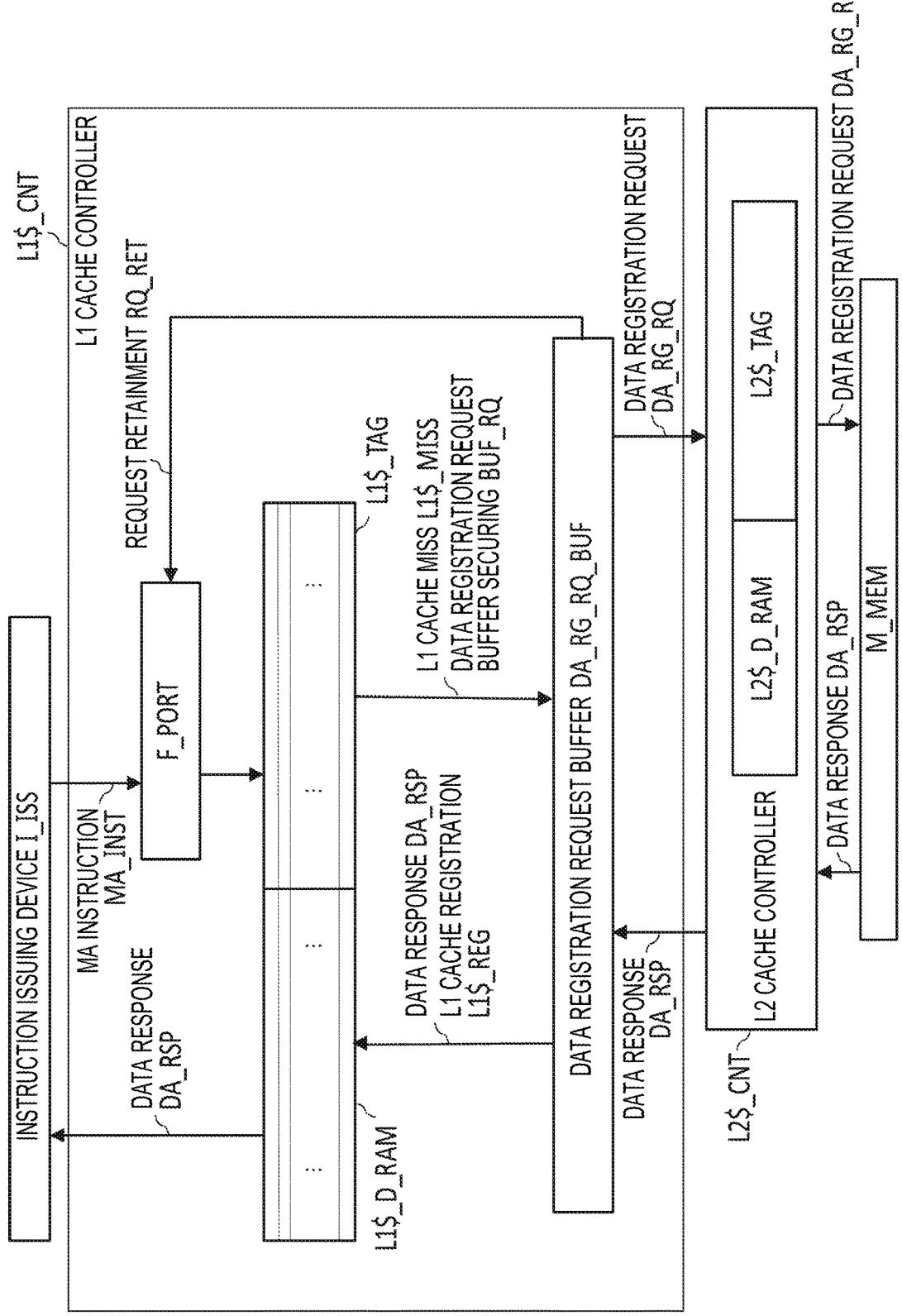
FIG. 4 is a diagram illustrating a schematic configuration example of an instruction issuing device, an L1 cache controller, and an L2 cache controller.

FIG. 4 is a diagram illustrating a schematic configuration example of the instruction issuing device, the L1 cache controller, and an L2 cache controller. An outline of processing of a memory access instruction issued by an instruction issuing device I_ISS will be described below.

The RSA of the instruction issuing device I_ISS issues a memory access instruction MA_INST to the L1 cache controller L1$_CNT of the L1 cache. The memory access instruction is assumed, for example, as a load instruction. The issued memory access instruction is temporarily stored in a fetch port F_PORT. When the memory access instruction in the fetch port or a memory access request MA_RQ corresponding thereto is sent into (input) the pipeline of the L1 cache controller, first, an L1 cache tag L1$_TAG is searched and a cache hit judgement is performed. When a cache hit occurs, data in an L1 cache data memory L1$_D_RAM are returned to the instruction issuing device as a data response DATA_RSP. The data of this data response are stored in the above-described renaming register or architecture register. The n L1 cache tag L1$_TAG and the L1 cache data memory L1$_D_RAM include a plurality of entries, respectively.

On the other hand, when a cache miss L1$_MISS occurs, the data requested to the L1 cache are required to be registered. Therefore, a data registration request buffer DA_RQ_BUF is initially secured. In the data registration request buffer, information on the memory access request MA_RQ is stored. In a case where the data registration request buffer may not be secured, the memory access request MA_RQ is sent back to the fetch port F_PORT, and the memory access request retains in the fetch port.

When the data registration request buffer is secured, the L1 cache controller issues a data registration request DA_RQ to an L2 cache controller L2$_CNT of the L2 cache. In response to this, the L2 cache controller executes the same control as that of the L1 cache controller described above (the cache judgement, the data response in the case of the cache hit, the data registration request to the main memory in the case of the cache miss (memory access request), or the like).

After a while, the L2 cache controller transmits a data response DATA_RSP to the L1 cache controller. In response thereto, the L1 cache controller performs cache registration of the data of the data response in the L1 cache data memory L1$_D_RAM and the L1 cache tag L1$_TAG. The L1 cache controller outputs the data response of the data subjected to the cache registration in the L1 cache data memory L1$_D_RAM.

Note that as will be described later, when receiving the data response from the L2 cache controller, the L1 cache controller performs the cache registration of the data of the data response in the L1 cache data memory L1$_D_RAM and the L1 cache tag L1$_TAG, and sends the memory access request MA_RQ from the fetch port into the pipeline of the L1 cache controller again. The sent memory access request obtains a cache hit with the L1 cache tag, the L1 cache controller performs a data response with the data in the L1 cache data memory L1$_D_RAM. The L1 cache controller may perform, instead of processing the resent memory access request and performing the data response, data registration in the L1 cache and a data response using the data.

Both the data registration request DA_RG_RQ issued by the L1 cache controller to the L2 cache controller and the data registration request DA_RG_RQ issued by the L2 cache controller to the main memory M_MEM described above are a kind of memory access request issued to the main memory side, when the cache miss occurs. The data read from the main memory by this memory access request, or the data read from the cache memory of the higher level cache controller are returned by the data response and subjected to the cache registration.

Instruction Decoder

Figure 5:
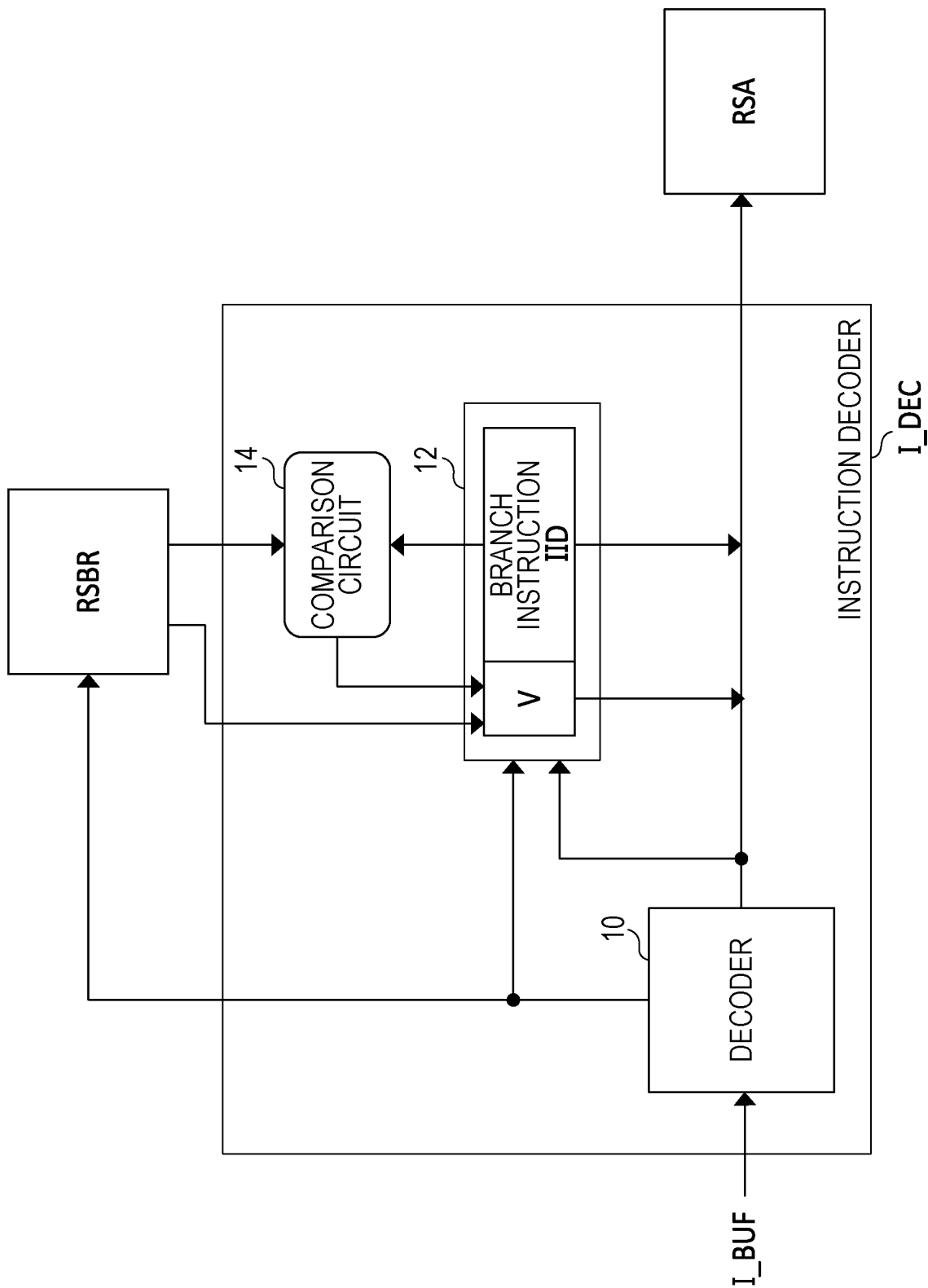
FIG. 5 is a diagram illustrating a configuration example of an instruction decoder according to the present embodiment.

FIG. 5 is a diagram illustrating a configuration example of the instruction decoder according to the present embodiment. The instruction decoder I_DEC receives the fetch instructions in the instruction buffer I_BUF in order, decodes the fetch instructions, adds the instruction identification IID (instruction ID) of the branch instruction which is not determined and a speculative access flag to the memory access instruction issued during the branch prediction of the branch instruction, and issues the result to the RSA.

The instruction decoder I_DEC includes a decoder 10 for decoding the fetch instruction, a branch instruction buffer 12 for storing the instruction identification IID of the branch instruction and a valid signal V thereof, and a comparison circuit 14. The decoder 10 in the instruction decoder decodes the branch instruction, then assigns the IID to the branch instruction, stores it into the branch instruction buffer 12, and sets the valid signal V thereof to valid "1". The decoder 10 issues the branch instruction to the RSBR.

When the memory access instruction is issued while the branch instruction is not determined, the decoder 10 adds the valid signal V and the IID of the branch instruction thereto. This valid signal V serves as the speculative access flag indicating that the memory access instruction to be issued is speculatively executed.

When the branch destination of the branch instruction is determined, the RSBR transmits a branch determination notification signal indicating the branch determination and the IID of the branch instruction to the instruction decoder I_DEC. The comparison circuit 14 in the instruction decoder compares the IID in the branch instruction buffer 12 and the IID which is added to the branch determination notification from the RSBR, and when the both coincide with each other, sets the valid signal V in the branch instruction buffer 12 to invalid "0". With this, a branch determination state is obtained. The decoder 10 adds the valid signal V of invalid "0" as the speculative access flag to the memory access instruction which is issued in the branch determination state, and issues the resulting instruction to the RSA.

The decoder 10 decodes a new branch instruction, then updates the branch instruction buffer 12 with the instruction identification IID of the branch instruction. In this manner, in the branch instruction buffer 12, the IID of the immediately preceding branch instruction and the valid signal V indicating whether to be in the branch non-determination state (the valid signal V is "1") or the branch determination state (the valid signal V is "0") are stored.

As described above, the instruction decoder I_DEC adds, to the memory access instruction to be issued, the speculative access flag indicating whether the instruction is speculatively executed or non-speculatively executed and the IID of the branch instruction, and issues it to the RSA.

The memory access instruction is stored in an issue queue of the RSA. When the RSA issues the memory access instruction, the issued memory access instruction is stored in the fetch port in the L1 cache controller. When the RSBR transmits the branch determination notification signal of the branch instruction to the RSA and the L1 cache controller while adding the instruction identification IID of the branch instruction, the speculative access flag of the memory access instruction stored in the issue queue in the RSA is set as invalid, and the speculative access flag of the memory access instruction stored in the fetch port of the L1 cache controller is also set as invalid. In the fetch port of the L2 cache controller as well, the speculative access flag is set as invalid in the same manner.

Detail of L1 and L2 Cache Controllers of Present Embodiment

Although the L1 and L2 cache controllers will be described with reference to FIGS. 6A and 6B to FIG. 14, before the description, each term will be described. Speculative access information SP_AC_INF: Information relating to a speculative memory access added to the memory access instruction, including the following three kinds of information. Speculative access flag SP_AC_FLG: Indicates whether or not to be the speculative memory access. "1" indicates the speculative memory access. The valid signal of a branch instruction register of the instruction decoder is used as the speculative access flag. Branch instruction IID: The instruction identification IID of the immediately preceding branch instruction. Speculative data requested flag SP_DA_RQ_FLG: A flag indicating whether or not, for a speculative memory access request, a speculative entry cache miss occurs and the data registration request is issued. When the data registration request is issued due to the speculative entry cache miss, the speculative data requested flag is set to "1". Thereafter, for the sent memory access request, an L1 cache hit occurs, but since the speculative data requested flag is "1", the speculative entry cache miss is not generated, and the data response may be performed without issuing the data registration request again. Provisional registration information PR_R_INF: Information indicating whether or not registration in the cache is performed by the speculative memory access, the information is stored in the L1 cache tag and used for a speculative entry cache hit judgement. The provisional registration information includes a speculative entry flag SP_EN_FLG and the instruction identification IID of the branch instruction. Speculative entry flag SP_EN_FLG: When the speculative access flag of the speculative memory access request is "1", the speculative entry flag is set to "1". Speculative entry hit judgement section SP_EN_H_JDG: In a case where the cache hit occurs, a state is a provisional registration state (the speculative entry flag is "1"), and the speculative data requested flag is non-requested "0", the speculative entry cache miss is generated (the data registration request is issued to the L2 and the memory). On the other hand, in a case where the cache hit occurs, the state is the provisional registration state, and the speculative data requested flag is "1" of being requested, the speculative entry cache hit is generated and the data response is performed. Cache determination controller CA_DTR_CNT: When the branch instruction is completed and the branch destination is determined by branch prediction success, the cache determination controller changes provisional registration of the L2 cache to formal registration, and changes a provisional registration entry with which the branch IID of the L1 cache coincides to the formal registration (resets the speculative entry flag to "0"). When the branch destination is determined by a branch prediction failure, the provisional registration entry of the L2 cache is invalidated, and the provisional registration entry of the L1 cache is also invalidated. With this, in the subsequent LOAD instructions, the provisional registration entry is subjected to an L1 cache miss. Data registration request DA_RG_RQ: A memory access request which is issued to the main memory side when the cache miss or the speculative entry cache miss occurs.

L1 and L2 Cache Controllers of Single-Core

Figure 6A:
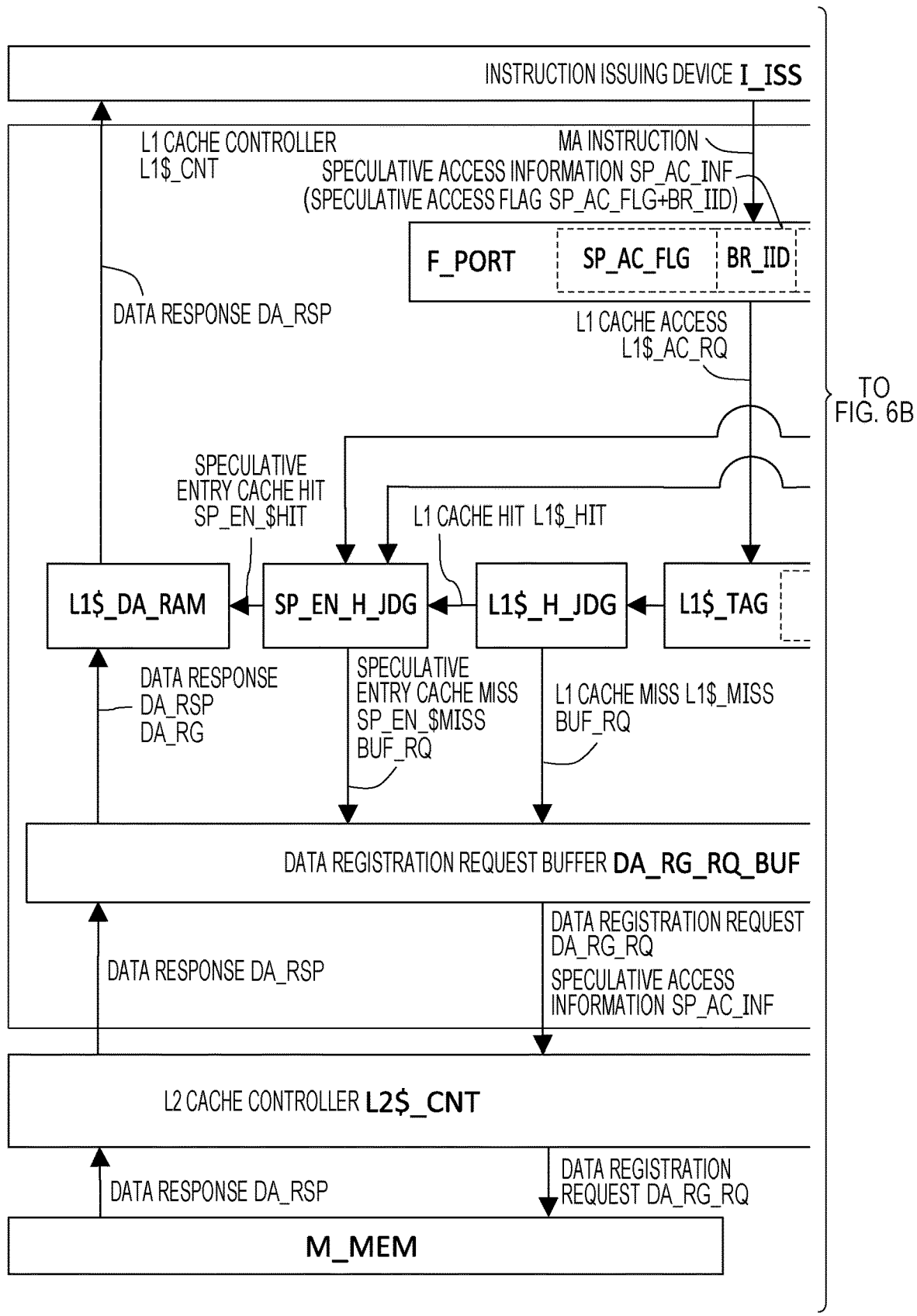
FIGS. 6A and 6B are diagrams illustrating a configuration of the L1 and L2 cache controllers according to the present embodiment in a case of a single-core.
Figure 6B:
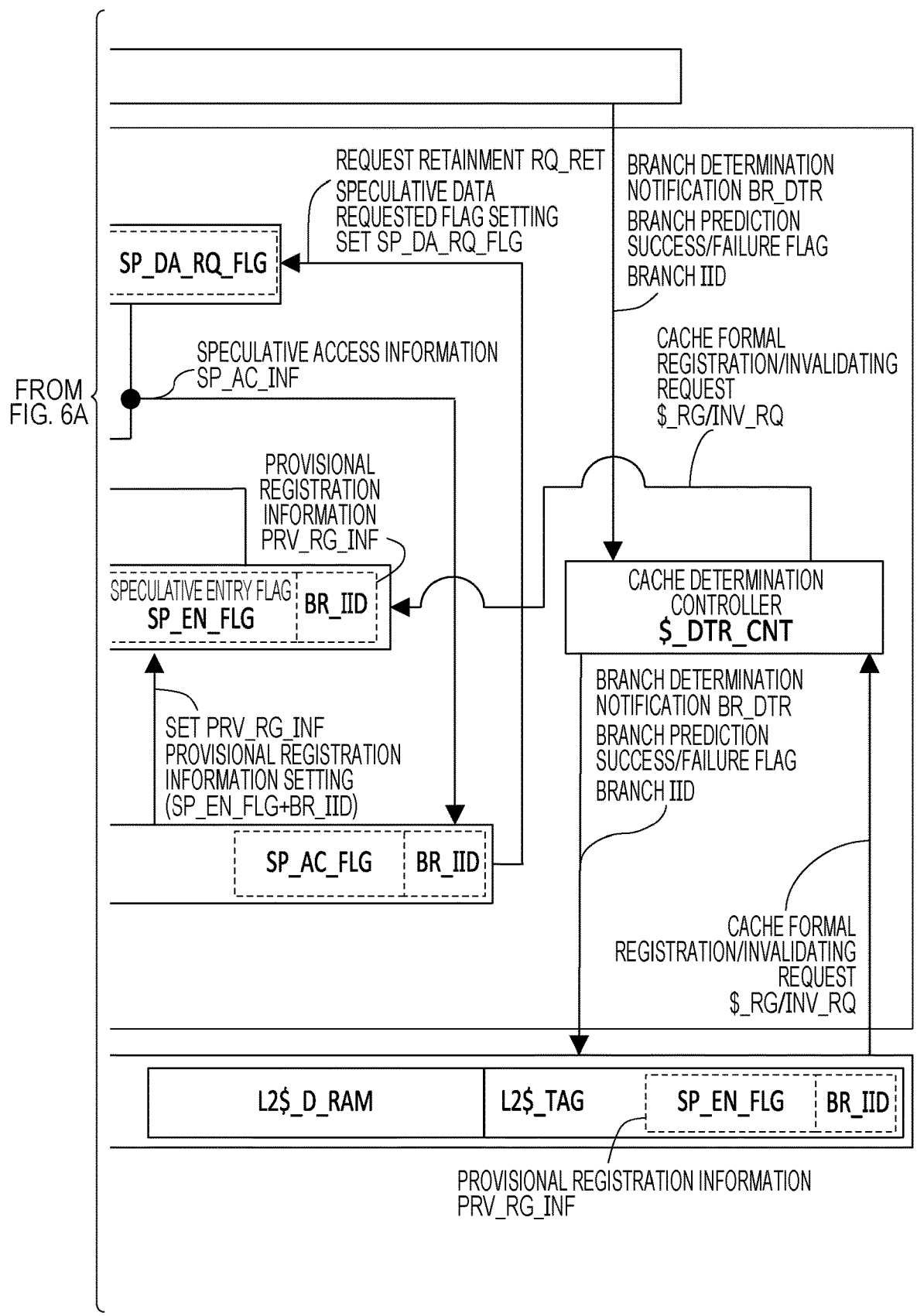

FIGS. 6A and 6B are diagrams illustrating a configuration of the L1 and L2 cache controllers according to the present embodiment in a case of a single-core. Although FIGS. 6A and 6B illustrate a detailed configuration of the L1 cache controller L1$_CNT and the configuration will be described below, the L2 cache controller L2$_CNT also has the same configuration as that of the L1 cache controller.

Unlike the configuration in FIG. 4, in a case of FIGS. 6A and 6B, in the fetch port F_PORT and the data registration request buffer DA_RG_RQ_BUF, as the speculative access information SP_AC_INF being information relating to the speculative memory access, the speculative access flag SP_AC_FLG and the IID of the branch instruction are stored while being added to the memory access instruction or request. In the fetch port F_PORT, the speculative data requested flag SP_DA_RQ_FLG is also stored. In the L1$ tag L1$_TAG and the L2$ tag L2$_TAG, as the provisional registration information PRV_RG_INF indicating that an entry is registered by a speculative memory access instruction, the speculative entry flag SP_EN_FLG and the IID of the branch instruction are stored while being added to a normal tag information (the address or state information (MESI)).

Unlike the configuration in FIG. 4, in the case of FIGS. 6A and 6B, in addition to an L1 cache hit judgement section L1$_H_JDG, the speculative entry cache hit judgement section SP_EN_H_JDG is provided. The speculative entry cache hit judgement section performs, in a case where the L1 cache hit occurs, when the hit entry of the L1 cache is in the provisional registration state (the speculative entry flag SP_EN_FLG is "1"), the speculative entry cache miss once, issues the data registration request to the L2 cache to cause to execute memory access to the main memory (NO in S20, YES in S21, and NO in S22 in FIG. 8A).

When being accessed with a different IID from the instruction identification IID of the branch instruction registered in the L1 cache tag by the speculative memory access instruction, the L1 cache controller issues the data registration request based on the speculative entry cache miss, at a time of the data response thereto, updates the IID in the L1 cache tag by the IID of the speculative memory access instruction. Alternatively, a method without the update may also be employed. Depending on which method is employed, different processing is performed as for which entry of the cache is formally registered when the branch instruction is completed in the branch prediction success.

When a non-speculative memory access instruction is issued, in a case where the L1 cache hit occurs, if the hit entry is in the provisional registration state, the L1 cache controller performs the speculative entry cache miss once in the same manner as described above (NO in S20 and NO in S21 in FIG. 8A). Upon receiving the data response from the L2 cache thereafter, the speculative entry flag of the L1 cache tag is set to "0" for invalidating, and the entry is changed in the formal registration state (S18 in FIG. 8B).

As described above, in a case where the entry in the provisional registration state is accessed, by exhibiting the cache miss at least once by the speculative entry cache miss, the L1 cache controller conceals the memory access latency of the memory access instruction LOAD3 to the address 100+X in FIG. 1.

Note that when the speculative memory access instruction is issued, the L1 cache controller performs the cache miss (NO in S13), and in a case where all in the L1 cache is formally registered (YES in S29 in FIG. 8A), suppresses the processing of the speculative memory access instruction until the branch instruction of the speculative memory access instruction is determined, sends back the memory access request to the fetch port, and causes it to retain in the fetch port. With this, it is possible to avoid the data in the cache memory which are already formally registered being expelled by the memory access instruction speculatively executed. This control is control in which, for example, in a case of being attacked by the speculative LOAD3 in a state of cache-filled (registered) in the L1 cache with the formal registration, without changing the cache state, until the branch determination of the branch instruction, the speculative LOAD3 is caused to retain in the fetch port.

On the other hand, in a case where the L1 cache hit occurs, when the hit entry of the L1 cache is not in the provisional registration state but in the formal registration state (SP_EN_FLG=0), the speculative entry cache hit judgement section performs the speculative entry cache hit, extracts the data from the L1 cache data memory L1$_DA_RAM, and the data response is performed. This processing is the same as the normal memory access instruction.

Unlike the configuration in FIG. 4, in the case of FIGS. 6A and 6B, upon receiving a branch determination notification BR_DTR for notifying of the branch instruction being completed and the branch destination being determined from the RSBR of the instruction issuing device, the cache determination controller CA_DTR_CNT changes the entry from the provisional registration to the formal registration when the branch prediction is a success, and invalidates the provisional registration entry when the prediction is a failure.

Figure 7:
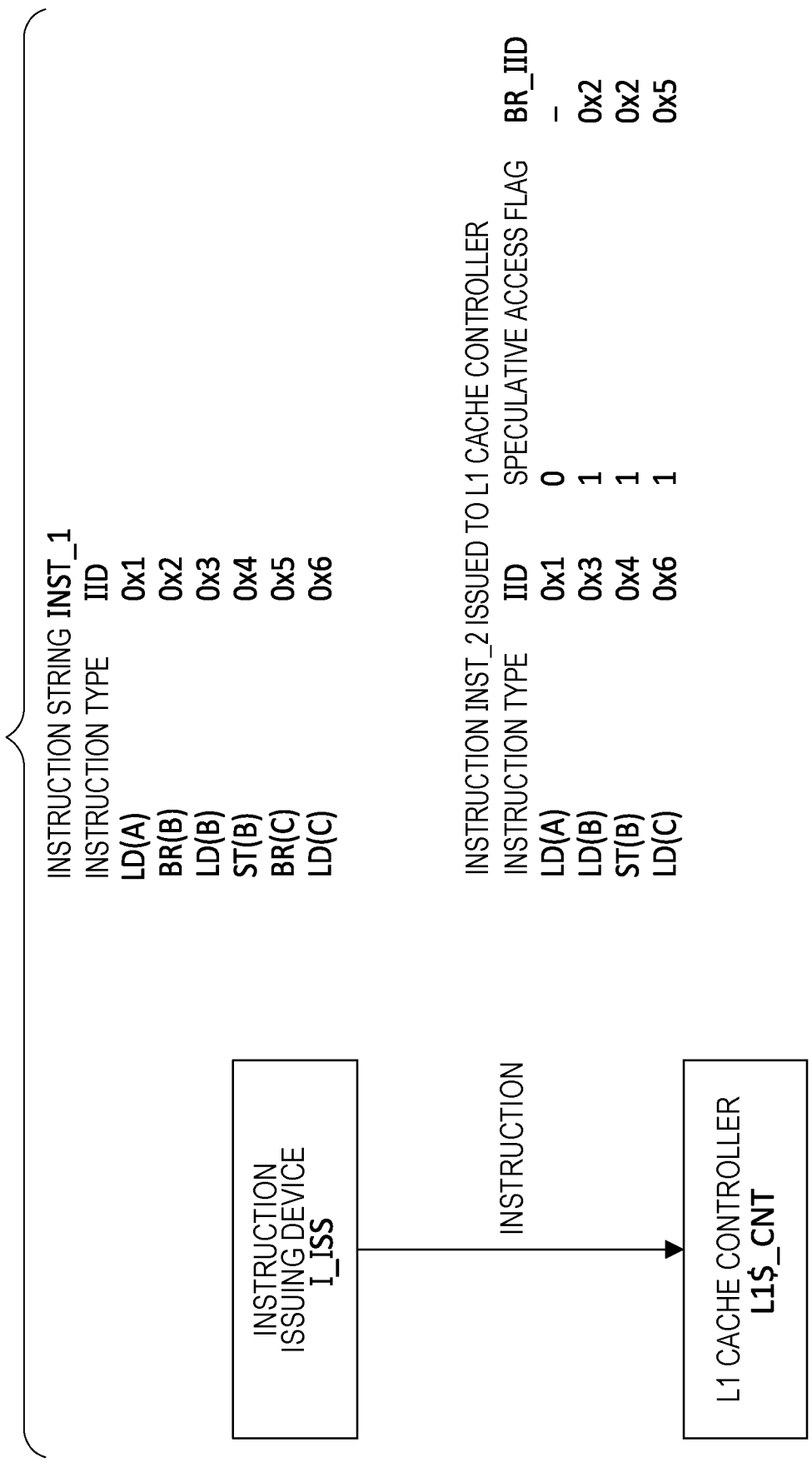
FIG. 7 is a diagram describing an instruction which is issued by the instruction issuing device to the L1 cache controller.

FIG. 7 is a diagram describing the instruction which is issued by the instruction issuing device to the L1 cache controller. The instruction issuing device I_ISS includes the instruction decoder I_DEC and the reservation station RSA as described above. FIG. 7 illustrates an instruction string INST_1 decoded by the instruction issuing device I_ISS. The L1 cache controller L1$_CNT is a circuit for controlling the processing of the memory access instruction on the L1 cache, FIG. 7 illustrates an instruction INST_2 which is issued to the L1 cache controller.

As the instruction string INST_1 decoded by the instruction issuing device, an example of an instruction type and the instruction identification IID thereof is illustrated. According to this example, two branch instructions BR(B) and BR(C), a load instruction LD(B) and a store instruction ST(B) on a succeeding side of the branch instruction BR(B), a load instruction LD(C) on a succeeding side of the branch instruction BR(C), and a load instruction LD(A) which does not belong to the branch instruction are included.

On the other hand, in the fetch port of the L1 cache controller, of the above-described instruction string INST_1 decoded by the instruction issuing device, the load instructions LD and the store instruction ST each of which is the memory access instruction are queued. As described in the instruction decoder in FIG. 5, to these load instructions and the store instruction, the speculative access flag and the IID of the branch instruction are added. In the example in FIG. 7, the instruction INST_2 includes the load instruction LD(A) with the speculative access flag of "0", and the load instruction LD(B), the store instruction ST(B), and the load instruction LD(C) with "1", to each of the store instruction and load instructions with the speculative access flag of "1", the IID of the branch instruction to which each of these instructions belongs is added.

Figure 8A:
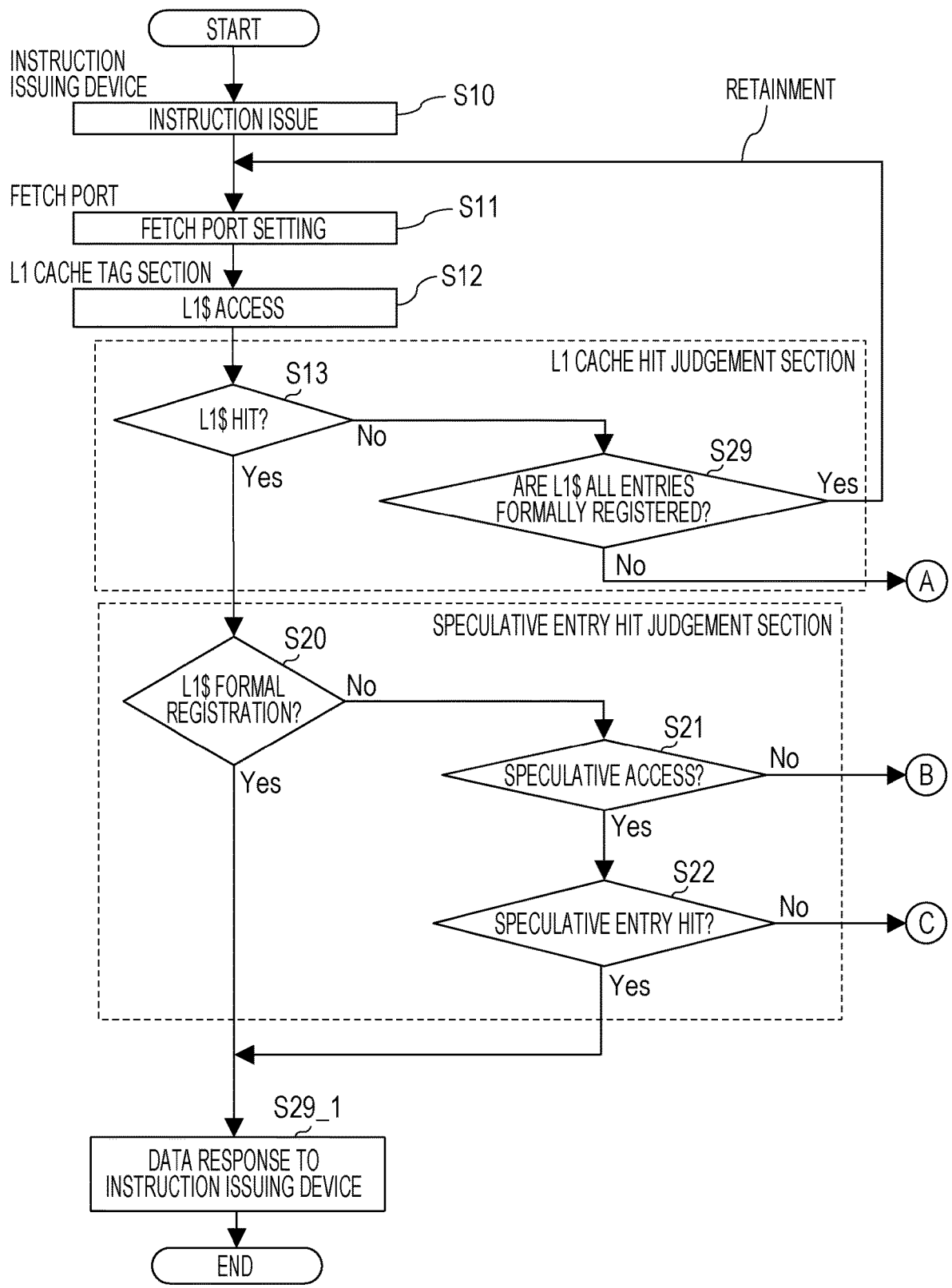
FIGS. 8A and 8B are flowcharts illustrating an operation of the L1 cache controller.
Figure 8B:
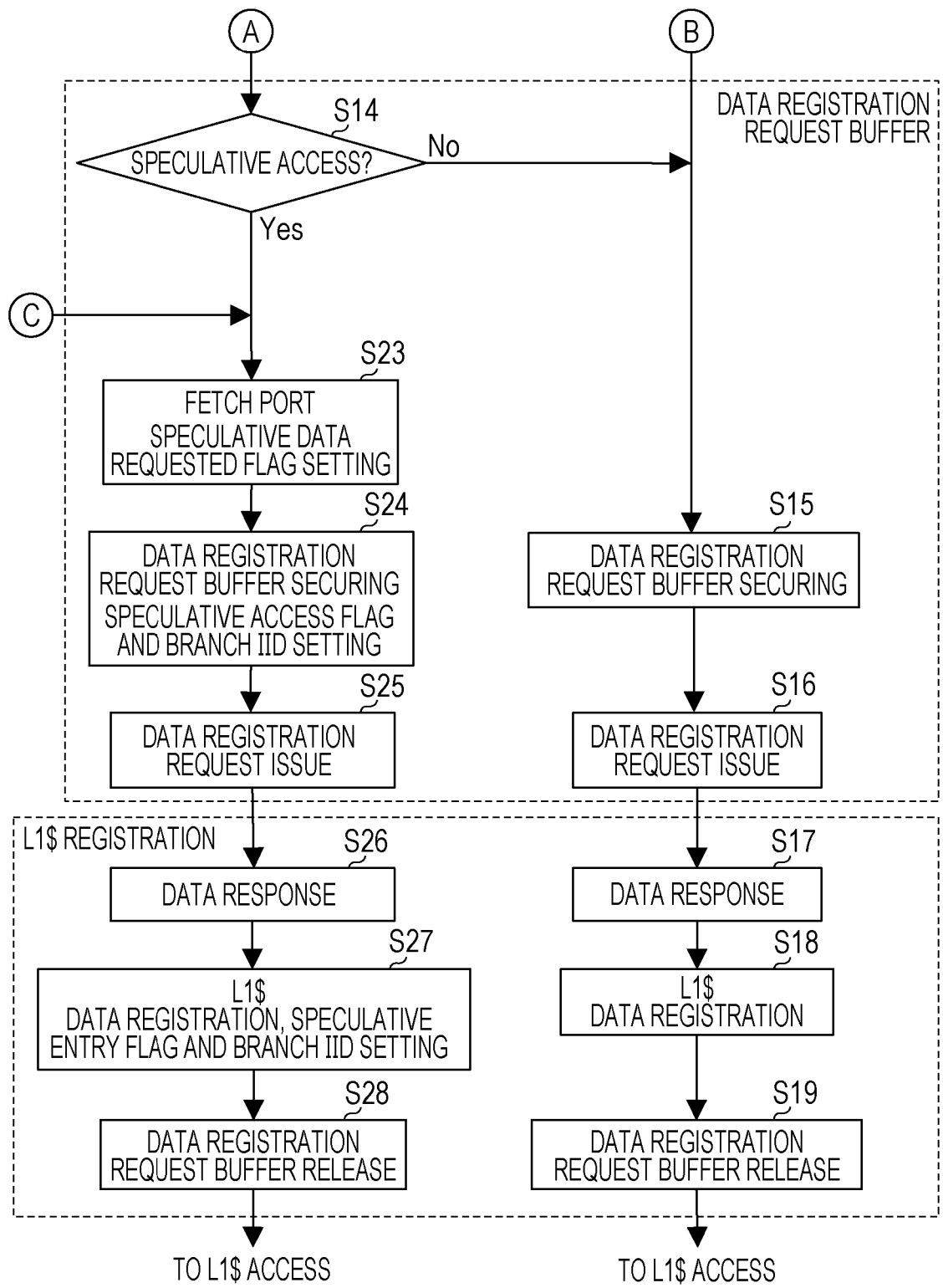

FIGS. 8A and 8B are flowcharts illustrating an operation of the L1 cache controller. The operation of the L2 cache controller is the same as that of the L1 cache controller except that the data registration request being issued when the cache miss occurs in the L1 cache controller is not to the L2 cache controller but to the main memory.

The flowcharts of FIGS. 8A and 8B include the memory access instruction (hereinafter, referred to as an MA instruction) issue S10 from the instruction issuing device, processing S11 for setting (storing) the MA instruction in the fetch port F_PORT, processing S12 in which an L1 cache access request with respect to the MA instruction is issued from the fetch port to the L1 cache, processing S13 of the L1 cache hit judgement section L1$_H_JDG, processing S20 to S22 of the speculative entry hit judgement section SP_EN_H_JDG, processing S14 to S16 and S23 to 25 in the data registration request buffer DA_RG_RQ_BUF, and registration processing S17 to S19 and S26 to S28 at the L1 cache at the time of the data response from the L2 cache.

First Example of Speculative Entry Hit Judgement Section

Figure 9:
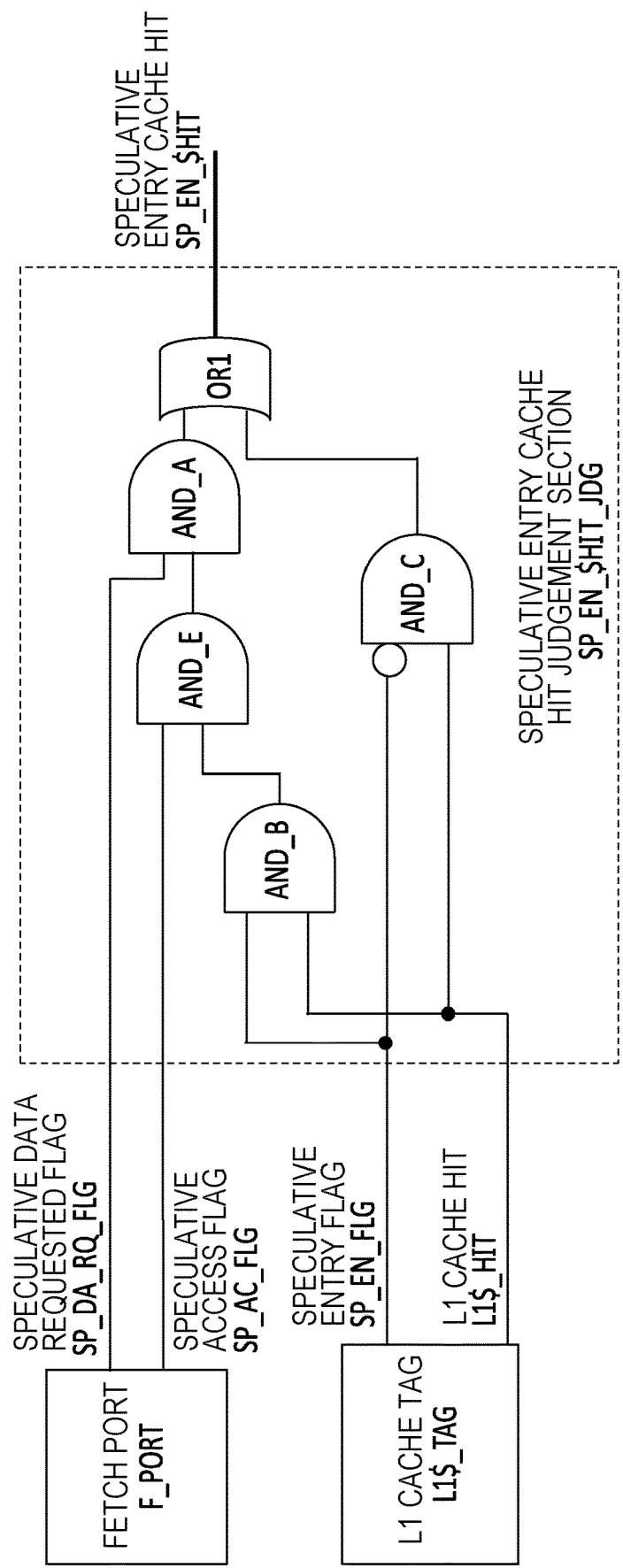
FIG. 9 is a diagram illustrating a first example of a logic circuit of a speculative entry hit judgement section.

FIG. 9 is a diagram illustrating a first example of a logic circuit of the speculative entry hit judgement section. In this first example, the speculative entry flag SP_EN_FLG of the entry of the L1 cache TAG for which the L1 cache hit occurs, and an L1 cache hit signal L1_$HIT from the L1 cache hit judgement section L1$_H_JDG are input to the speculative entry hit judgement section SP_EN_H_JDG. The speculative access flag SP_AC_FLG and the speculative data requested flag SP_DA_RG_RQ_FLG of the issued MA instruction in the fetch port F_PORT are further input thereto. The speculative entry hit judgement section includes four AND circuits AND_A, AND_B, AND_C, and AND_E and one OR circuit OR_1.

In a case where the speculative entry flag of the entry for which the L1 cache hit occurs is "0", the entry is in the formal registration state. In a case where the speculative entry flag is "0", the speculative entry hit/miss judgement section sets, using the AND circuit AND_C, a speculative entry cache hit signal to hit "1" in a case of the L1 cache hit (L1_$HIT=1), and also sets the speculative entry cache hit signal to miss "0" in a case of the L1 cache miss (L1_$HIT=0).

On the other hand, in a case where the speculative entry flag of the entry for which the L1 cache hit occurs is "1", the entry is in the provisional registration state, and the AND circuit AND_C outputs "0". On the other hand, the AND circuit AND_B outputs "1". When the speculative access flag SP_AC_FLG in the fetch port is "1", the AND circuit AND_E outputs "1", but when the speculative data requested flag is non-requested "0", the AND circuit AND_A outputs "0", and the speculative entry cache hit signal also becomes miss "0". Note that when the speculative data requested flag is non-requested "1", the AND circuit AND_A also outputs "1", and the speculative entry cache hit signal becomes hit "1". This control of the speculative entry cache miss and hit by the speculative data requested flag is performed for a reason for completing the speculative memory access, and will be described in detail in the following description of the L1 cache controller.

When the L1 cache hit is "1" and the speculative entry flag is "1" (provisional registration), in a case where the L1 cache access request is the non-speculative memory access instruction (SP_AC_FLG=0), the AND circuit AND_E sets the speculative entry cache hit signal to miss "0". This is the speculative entry cache miss by the judgement S21 of whether or not to be the speculative access in FIG. 8A becoming NO. In this case, the data of the data response to the data registration request of the non-speculative memory access instruction are registered in the L1 and L2 cache tags with the speculative entry flag "0"(formal registration) (S18).

Hereinafter, with reference to FIGS. 6A and 6B and FIGS. 8A and 8B, four kinds of control of the L1 cache controller will be described.

Control 1 of L1 Cache Controller

Control 1 of the L1 cache controller is control for the speculative LOAD2 in FIG. 1. In the speculative LOAD2, the L1 cache controller is subjected to the L1 cache miss, and issues the data registration request to the L2 cache. The L2 cache controller is subjected to the L2 cache miss, accesses the main memory, and performs the cache registration of the data read from the main memory in the L2 cache TAG with the speculative entry flag "1" (the speculative entry or the provisional registration) and the IID of the branch instruction. The L1 cache controller also performs the cache registration of the read data in the L1 cache TAG with the speculative entry flag "1" (the speculative entry or the provisional registration) and the IID of the branch instruction.

Figure 10:
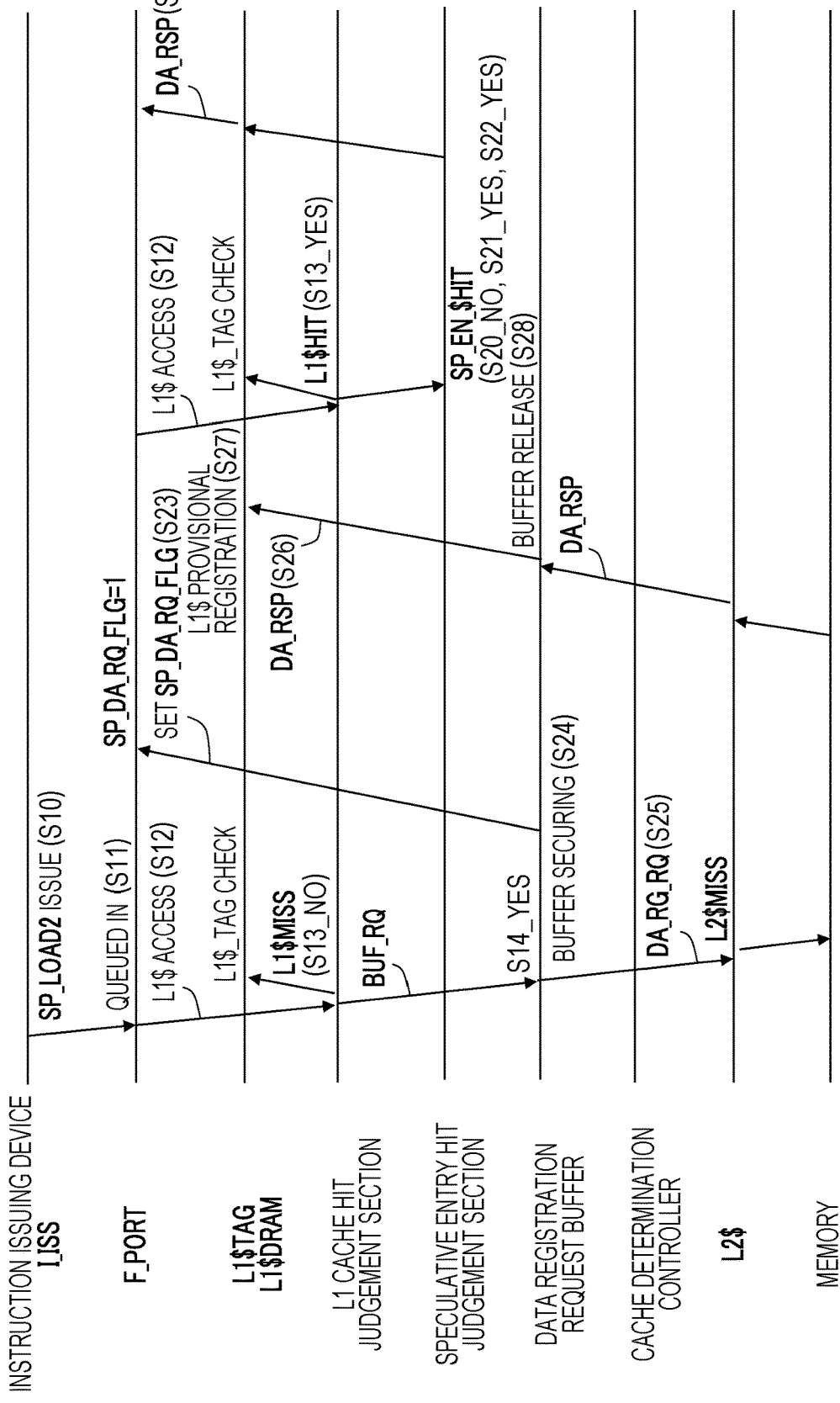
FIG. 10 is a sequence chart illustrating an operation of control 1.

FIG. 10 is a sequence chart illustrating an operation of the control 1. First, the instruction issuing device issues the speculative LOAD2 (S10), the speculative LOAD2 is queued in the fetch port in the L1 cache controller (S11). In entry in the fetch port, in addition to the instruction type, an access destination address, and the like of the speculative LOAD2, the speculative access flag SP_AC_FLG=1, the IID of the branch instruction, and the speculative data requested flag SP_DA_RQ_FLG=0 are stored.

Next, an L1 cache access request L1$_AC_RQ of the speculative LOAD2 is issued from the fetch port (S12), the L1 cache hit judgement section L1$_H_JDG performs cache hit judgement with reference to the L1 cache tag. As described in FIG. 1, since the cache flush is initially performed, all the entries of the L1 cache tag are invalid, and the L1$ miss occurs here (NO in S13).

In response thereto, a securing request BUF_RQ of the data registration request buffer is generated. For this request, when it is possible to secure the data registration request buffer, since the speculative LOAD2 is a speculative instruction (YES in S14), the data registration request buffer sets the speculative data requested flag of the speculative LOAD2 in the fetch port to SP_DA_RQ_FLG=1 (S23). Furthermore, the data registration request buffer records information on the L1 cache access request and the speculative access information SP_AC_INF thereof in the secured data registration request buffer (S24), and issues the data registration request DA_RG_RQ to the L2 cache controller (S25).

The L2 cache controller performs the same control as that of the L1 cache controller for the data registration request from the L1 cache controller, is subjected to the L2 cache miss, accesses the main memory, reads load destination data of the speculative LOAD2, and registers them in the L2 cache. In response to the data response from the L2 cache controller (S26), the L1 cache controller performs the cache registration in the L1 cache (S27).

When the cache registration in the L1 cache is performed, the L1 cache access request L1$_AC_RQ is issued again from the fetch port (S12), and the L1 cache hit occurs (YES in S13). The speculative entry cache hit judgement section performs the speculative entry cache hit because of the speculative data requested flag SP_DA_RQ_FLG in the fetch port being "1" (NO in S20, YES in S21, and YES in S22), a data response DA_RSP is transmitted to the instruction issuing device (S29_1).

As described above, by executing the speculative LOAD2, in the L1 cache tag and the L2 cache tag, in addition to the normal tag information (a valid bit, a state value (MESI), and an address), the speculative entry flag SP_EN_FLG=1 and the IID of the immediately preceding branch instruction of the speculative LOAD2 are registered, and recording as the provisional registration is performed.

Control 2 of L1 Cache Controller

Control 2 of the L1 cache controller is control in a case where the speculative LOAD3 to the same address 100+X as that in the speculative LOAD2 in FIG. 1 is executed. In this case, although the L1 cache hit occurs, the speculative entry cache hit judgement SP_EN_$H_JDG judges as the speculative entry cache miss, access to the main memory passing through the L2 cache occurs. For the data response from the main memory, the L2 cache controller performs the cache registration in the L2 cache TAG with the speculative entry flag "1" (the speculative entry or the provisional registration) and the IID of the branch instruction. The L1 cache controller also performs the cache registration in the L1 cache TAG with the speculative entry flag "1" (the speculative entry or the provisional registration) and the IID of the branch instruction.

As described above, in the speculative LOAD3, although the L1 cache hit is obtained, the speculative entry cache miss occurs, and access to the main memory is generated. The provisional registration information (the speculative access flag "1" and the IID of the branch instruction) is registered in the L2 cache tag and the L1 cache tag with the speculative access information of the speculative LOAD2 again, the data read from the main memory are registered in the L2 and L1 cache data memories.

Figure 11:
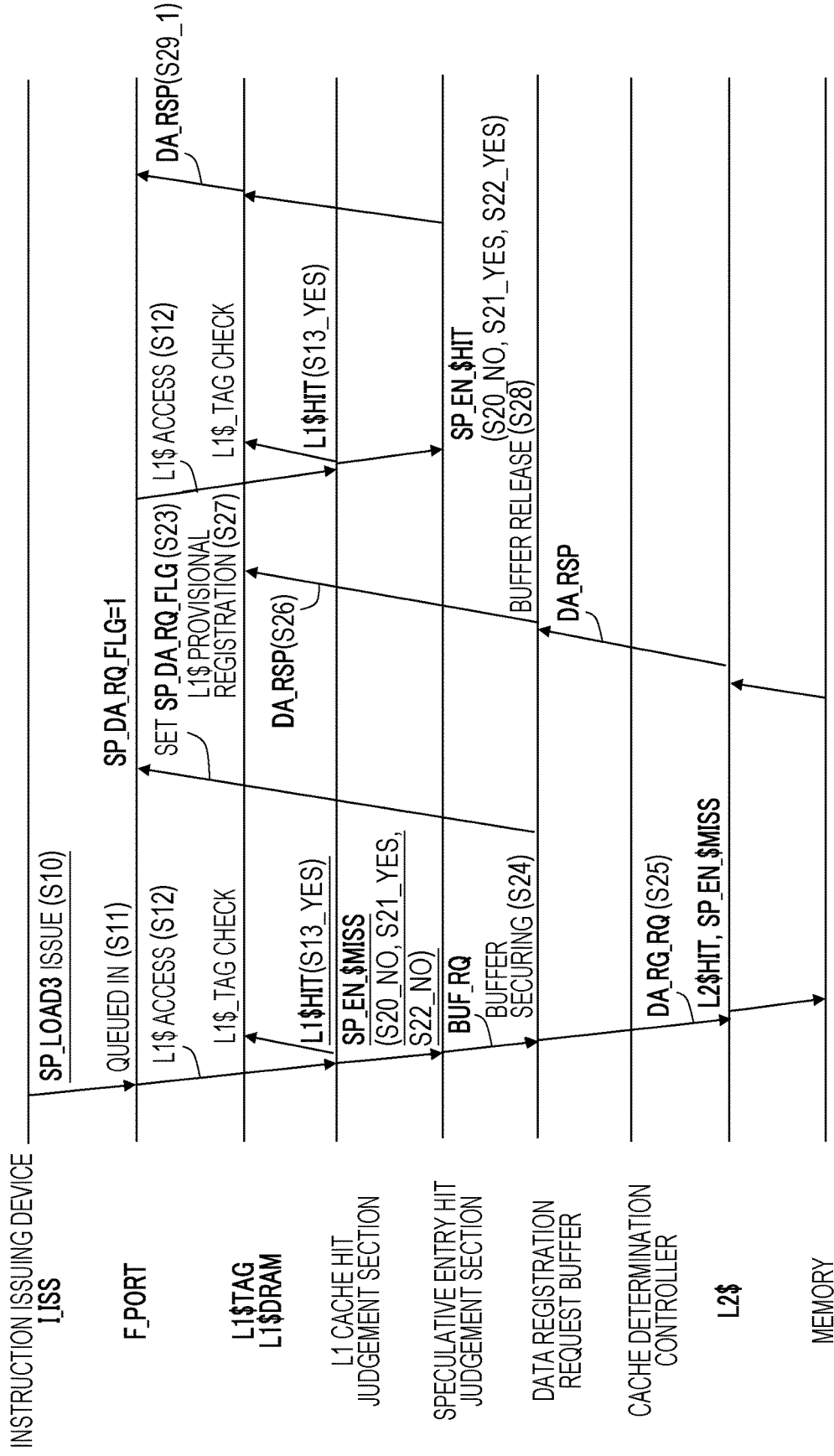
FIG. 11 is a sequence chart illustrating an operation of control 2.

FIG. 11 is a sequence chart illustrating an operation of the control 2. First, the instruction issuing device issues the speculative LOAD3 (S10), the speculative LOAD3 is stored in the fetch port in the L1 cache controller (S11). In the fetch port, in addition to the instruction type, an access destination address, and the like of the speculative LOAD3, the speculative access flag SP_AC_FLG=1, the IID of the branch instruction, and the speculative data requested flag SP_DA_RQ_FLG=0 are stored.

Next, the L1 cache access request of the speculative LOAD3 is issued from the fetch port (S12), the L1 cache hit judgement section L1$_H_JDG performs cache hit judgement with reference to the L1 cache tag. In the control 2, since the data are already registered by the speculative LOAD2 in the L1 cache, the L1 cache hit judgement section performs the L1 cache hit (YES in S13). This is different from the control 1.

In response to the L1 cache hit, since the speculative entry flag of the L1 cache tag is SP_EN_FLG=1 of the provisional registration, the speculative entry cache hit judgement section judges as the speculative entry cache miss (NO in S22). That is, for example, the AND circuits AND_B and AND_E in FIG. 9 each output "1", the AND circuit AND_C in FIG. 9 outputs "0" by the speculative data requested flag SP_DA_RQ_FLG=0 (non-requested) of the fetch port, and the speculative entry cache hit signal becomes miss "0".

As a result, the securing request BUF_RQ of the data registration request buffer is generated, the speculative access information is registered in the data registration request buffer (S24), and the data registration request DA_RG_RQ is issued to the L2 cache (S25). At the same time, the speculative data requested flag of the speculative LOAD3 in the fetch port is set to "1" (S23). The subsequent control is the same as the control 1 in FIG. 10, the data of the data response from the main memory are registered in the L2 cache and the L1 cache, the L1 cache hit occurs for the L1 cache access request which is sent again, the speculative entry cache hit occurs since the speculative data requested flag is "1", and the data response is transmitted to the instruction issuing device.

As described above, when the speculative LOAD3 is executed, although the L1 cache hit occurs, by the provisional registration information PRV_RG_INF (the speculative entry flag SP_EN_FLG is "1") of the L1 cache tag, the speculative entry cache miss occurs, and access to the main memory occurs. Accordingly, the latency of the speculative LOAD3 becomes long in the same manner as those of load instructions at other addresses, decrease in the latency by the cache hit is concealed, it is possible to suppress the address 100+X from being obtained by a malicious third party.

In the above-described control for the speculative LOAD3, after the provisional registration in the L1 cache (S27), without resending the L1 cache access request, the data response (S29_1) may be performed. In that case, after the L1 cache hit occurs in response to the first L1 cache access request L1$_AC_RQ for the speculative LOAD3, when the entry for which the L1 cache hit occurs is provisionally registered (SP_EN_FLG=1), the speculative entry cache hit judgement section performs the speculative entry cache miss. Accordingly, the logic circuit of the speculative entry cache hit judgement section SP_EN_$H_JDG in FIG. 9 includes only the AND circuit AND_C, in a case of the L1 cache hit, when the speculative entry flag is "1" of the provisional registration, judges as the speculative entry cache miss, and when the speculative entry flag is "0" of the formal registration, judges as the speculative entry cache hit.

Control 3 of L1 Cache Controller

Control 3 of the L1 cache controller is control in a case where the non-speculative LOAD3 to the address 100+X in FIG. 1 is executed. In this case, the L1 cache hit occurs, the speculative entry cache hit judgement SP_EN_$H_JDG judges as the speculative entry cache miss, access to the main memory through the L2 cache occurs. For the data response from the main memory, the formal registration in the L2 cache TAG is performed with the speculative entry flag "0" (the non-speculative entry or the formal registration) and the IID of the branch instruction. The L1 cache controller also performs the cache registration in the L1 cache TAG with the speculative entry flag "0" (the non-speculative entry or the formal registration) and the IID of the branch instruction.

Figure 12:
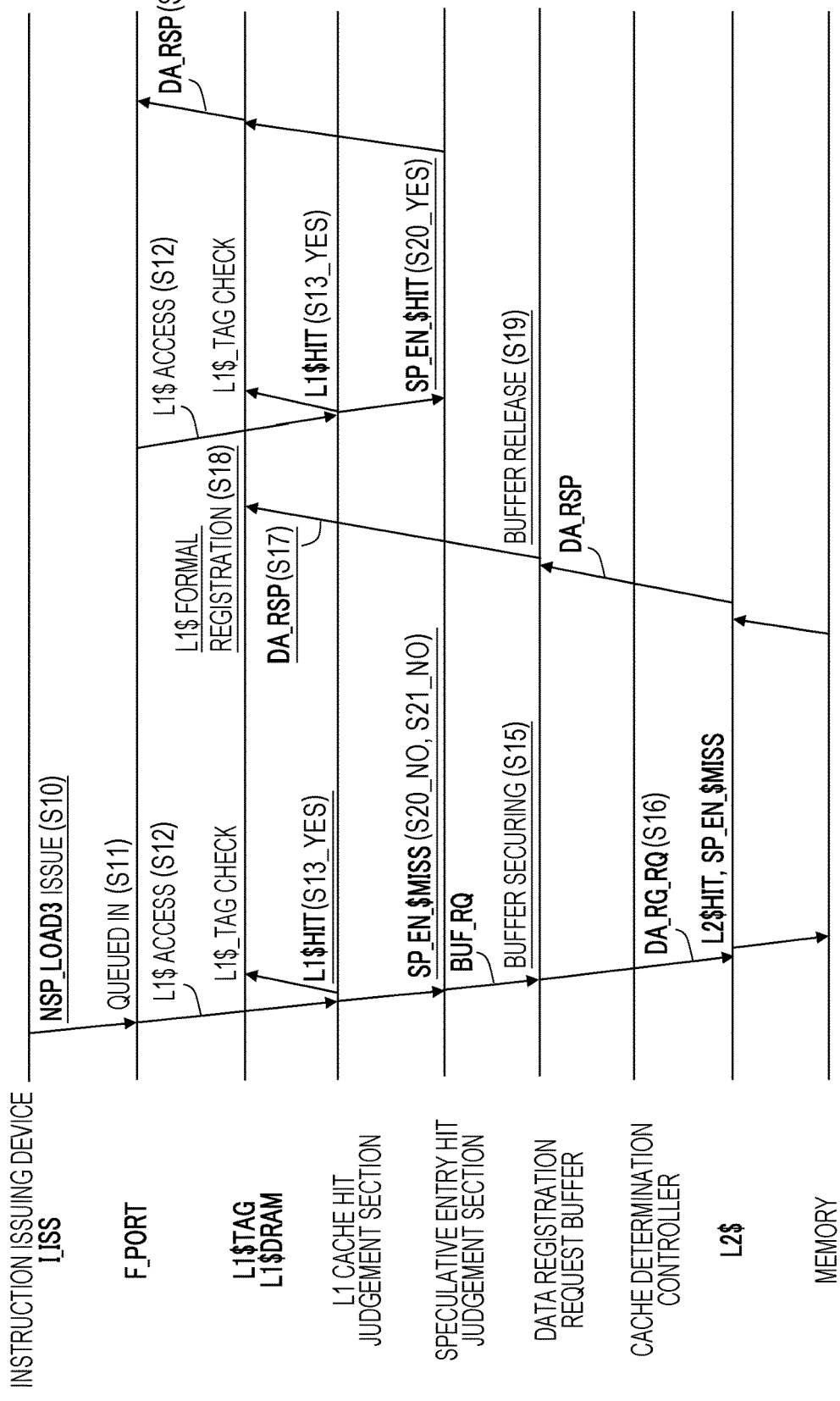
FIG. 12 is a sequence chart illustrating an operation of control 3.

FIG. 12 is a sequence chart illustrating an operation of the control 3. First, the instruction issuing device issues the non-speculative LOAD3 (S10), the non-speculative LOAD3 is stored in the fetch port in the L1 cache controller (S11). In the fetch port, in addition to the instruction type, an access destination address, and the like of the non-speculative LOAD3, the speculative access flag SP_AC_FLG=0, the IID of the branch instruction, and the speculative data requested flag SP_DA_RQ_FLG=0 are stored.

Next, the L1 cache access request L1$_AC_RQ of the speculative LOAD3 is issued from the fetch port (S12), the L1 cache hit judgement section L1$_H_JDG performs cache hit judgement with reference to the L1 cache tag. In the control 3, since the data are already registered by the speculative LOAD2 in the L1 cache, the L1 cache hit judgement section performs the L1 cache hit (YES in S13).

In response to the L1 cache hit, although the speculative entry flag of the L1 cache tag is SP_EN_FLG=1 of the provisional registration (NO in S20), since the AND circuit AND_E in FIG. 9 outputs "0" due to the non-speculative LOAD3, the speculative entry cache hit judgement section judges as the speculative entry cache miss (NO in S21).

As a result, the securing request BUF_RQ of the data registration request buffer is generated, the speculative access information is registered in the data registration request buffer (S15), and the data registration request is issued to the L2 cache (S16). In this case, setting the speculative data requested flag of the corresponding instruction in the fetch port (S23) is not performed.

The control after the data response (S17) is different from that of the control 2 in FIG. 11, the data of the data response from the main memory are formally registered in the L2 cache and the L1 cache (S18). Thereafter, the L1 cache hit for a resent L1 cache access request (S12) occurs (YES in S13), but is judged as the speculative entry cache hit (YES in S20) since the L1 cache is formally registered, the data response is transmitted to the instruction issuing device (S29_1). In a case where the non-speculative LOAD3 is issued, after the speculative entry cache miss, since the formal registration in the L2 and L1 caches is performed, the speculative entry cache hit occurs for the resent L1 cache access request.

As described above, although the L1 cache hit occurs by executing the non-speculative LOAD3, the speculative entry cache miss occurs by the provisional registration information PRV_RG_INF (the speculative entry flag SP_EN_FLG is "1") of the L1 cache tag and the speculative access information (SP_AC_FLG is "0") of the non-speculative LOAD3 in the fetch port. With this, the access to the main memory occurs, the latency of the non-speculative LOAD3 increases in the same manner as those of load instructions at other addresses, it is possible to suppress the address 100+X from being obtained by a malicious third party.

Control 4 of L1 Cache Controller

Control 4 of the L1 cache controller is processing of the cache determination controller in a case of receiving the branch determination notification from the RSBR of the instruction issuing device. In the control 4, the cache determination controller of each of the L1 and L2 caches changes the entry which coincides with the IID of the branch instruction from the provisional registration to the formal registration in a case where the branch determination notification is branch prediction success, and invalidates all the provisionally registered entries in the L1 and L2 caches (sets the valid signal to "0") in a case of the branch prediction failure.

Figure 13:
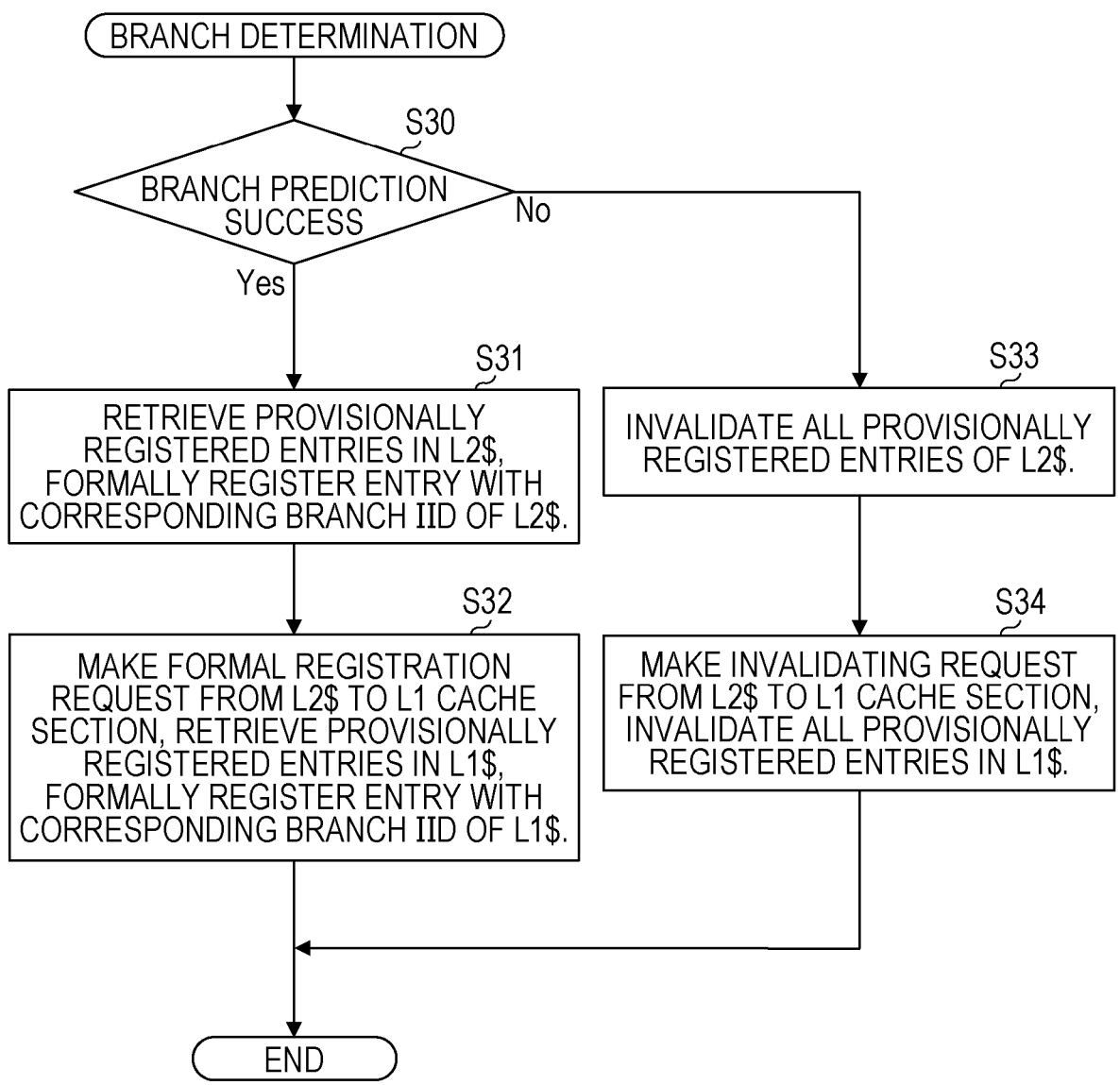
FIG. 13 is a flowchart of control 4 of the L1 cache controller.
Figure 14:
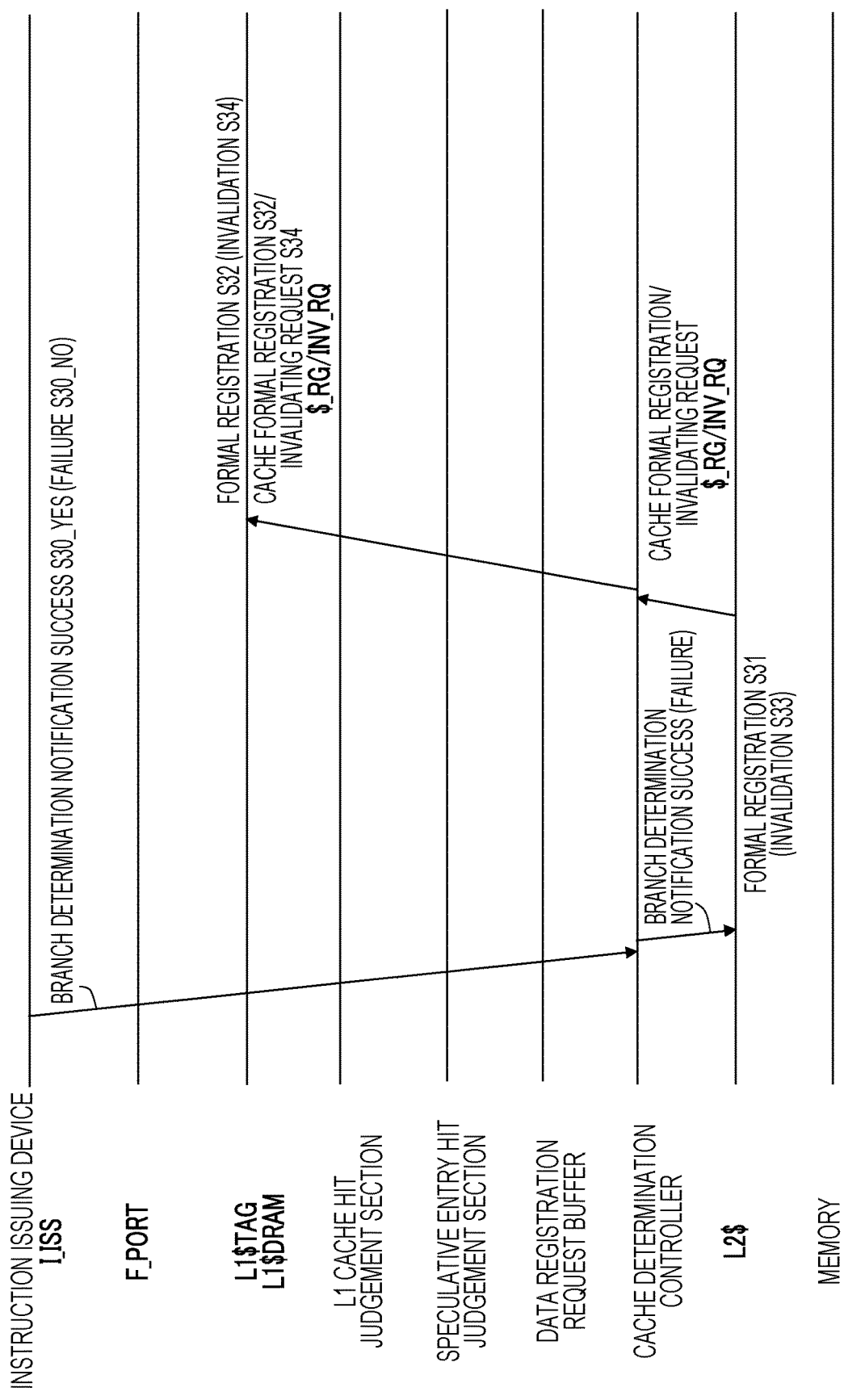
FIG. 14 is a sequence chart of the control 4 of the L1 cache controller.

FIG. 13 is a flowchart of the control 4 of the L1 cache controller. FIG. 14 is a sequence chart of the control 4 of the L1 cache controller.

First, the branch determination notification BR_DTR received from the RSBR of the instruction issuing device includes a flag indicating whether the branch prediction is a success or a failure and the IID of the branch instruction. When receiving the branch determination notification, in a case where the branch prediction is a success (YES in S30), the cache determination controller CA_DTR_CNT in the L1 cache controller issues the branch determination notification BR_DTR to the L2 cache controller. The cache determination controller in the L2 cache controller changes the speculative entry flag SP_EN_FLG of an entry which coincides with the IID of the branch instruction of the branch determination notification among the entries provisionally registered in the L2 cache to "0" of the formal registration (S31). Furthermore, when the cache determination controller of the L2 cache controller issues a cache formal registration request $_RG/INV_RQ to the L1 cache controller, the cache determination controller $_DTR_CNT of the L1 cache controller changes the speculative entry flag SP_EN_FLG of an entry which coincides with the IID of the branch instruction among the entries provisionally registered in the L1 cache to "0" of the formal registration (S32).

In the above-described change processing to the formal registration (S31 and S32), in a case where the IID of the branch instruction of the speculative memory access instruction is different from the IID of the branch instruction of the provisional registration entry of the cache tag as described above, by employing a method in which the IID of the entry of the cache tag is not updated, it is possible to collectively change the registration of the entries of the speculative memory access instructions after the IID of the provisionally registered first branch instruction to the formal registration. On the other hand, by employing a method of updating, the registration of the entry corresponding to the IID of the branch instruction whose branch is determined is changed to the formal registration each time.

On the other hand, in a case of the branch prediction failure (NO in S30), the cache determination controller CA_DTR_CNT in the L1 cache controller issues the branch determination notification BR_DTR to the L2 cache controller. The cache determination controller in the L2 cache controller invalidates all the provisionally registered entries in the L2 cache (S33). Furthermore, when the cache determination controller of the L2 cache controller issues a cache invalidating request to the L1 cache controller, the cache determination controller of the L1 cache controller invalidates all the provisionally registered entries in the L1 cache (S34).

In a case of the branch prediction failure, the memory access instruction at the branch prediction destination of the branch instruction subjected to the branch prediction failure and the memory access instruction at the branch prediction destination of the branch instruction after the branch instruction subjected to the branch prediction failure are all cancelled in the pipeline, and therefore all the provisionally registered entries are invalidated in the L2 cache and the L1 cache. Since the branch of the branch instruction positioned before the branch instruction subjected to the branch prediction failure has been determined, a provisionally registered cache entry corresponding to the memory access instruction after the branch instruction positioned before the branch instruction subjected to the branch prediction failure is not present.

In a case where the branch is determined by the branch prediction failure as described above, in the present embodiment, it is possible to invalidate the entry in the provisional registration state of the cache tag. As a result, after the branch is determined by the branch prediction failure, to the attack by the non-speculative LOAD3 described above, the cache miss occurs, and it is possible to conceal a difference in the latency.

Second Example of Speculative Entry Hit Judgement Section

Figure 15:
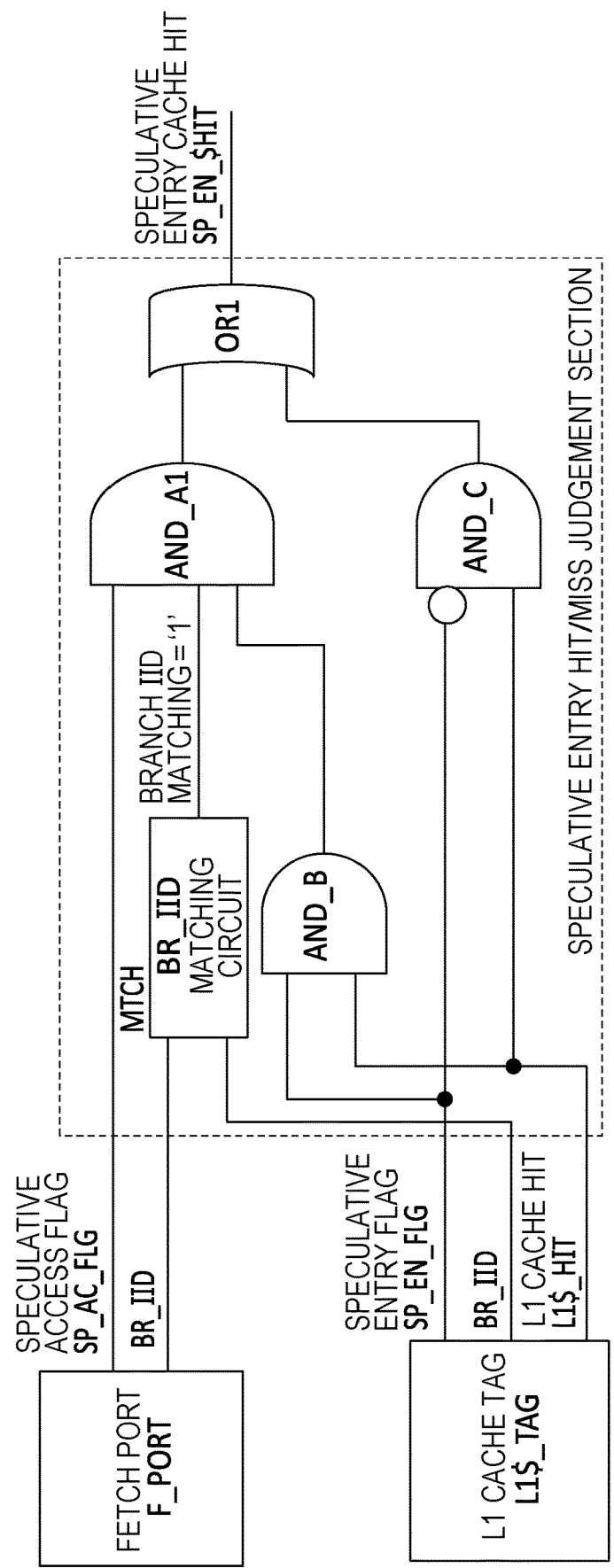
FIG. 15 illustrates a second example of the speculative entry hit judgement section in a case of the single-core.

FIG. 15 illustrates a second example of the speculative entry hit judgement section in a case of the single-core. In the second example as well, a configuration and a flowchart are the same as the configuration in FIGS. 6A and 6B and the flowcharts in FIGS. 8A and 8B in the first example. In the first example, in a case of the cache entry (SP_EN_FLG=1) in the provisional registration state, using the speculative data requested flag, the judgement as the speculative entry miss is performed at the first time, and then the judgement as the speculative entry hit for the resent L1 cache request is performed.

However, since the memory access instructions after the same branch instruction are not a security attack target as the LOAD3 in FIG. 1, an execution time (latency) of the memory access may not be concealed. An example of an instruction string will be described below. Branch instruction BR1 (IID=A) Speculative LOAD2 (IID=A) Speculative LOAD_L (IID=A) Speculative LOAD_M (IID=A) Branch instruction BR2 (IID=X) Speculative or non-speculative LOAD3 (IID=X)

In the above-described case, the provisional registration in the L1 cache tag is performed by the speculative LOAD2 while the branch of the branch instruction BR1 is not determined, the execution time of the memory access is measured at the speculative or non-speculative LOAD3 after the branch instruction BR2, and the security attack is performed. In the above-described example, the speculative LOAD_L and the speculative LOAD_M after the branch instruction BR1 are not instructions for the security attack, the execution time of the memory access may not be concealed. On the other hand, the speculative or non-speculative LOAD3 after the branch instruction BR2 which is different from the branch instruction BR1 has high possibility to be the instruction for the security attack.

In the second example, in a case of the speculative memory access instruction after the branch instruction BR1 in the same manner as the speculative LOAD2 such as the speculative LOAD_L and LOAD_M in the above-described example, as the speculative entry cache hit, performance reduction by the cache miss is suppressed. The configuration therefor includes a branch instruction IID matching circuit MTCH and an AND circuit AND_A1. In other words, for example, in a case where the L1 cache hit occurs and the L1 cache tag is the provisional registration (the speculative entry flag is "1"), the AND circuit AND_B outputs "1". In a case where the branch IID of the fetch port and the branch IID in the L1 cache tag coincide with each other, the branch instruction IID matching circuit MTCH outputs "1". The speculative access flag of each of the speculative LOAD_L and LOAD_M is "1". Accordingly, the AND circuit AND_A1 outputs "1", and the judgement as the speculative entry cache hit is performed.

On the other hand, in a case of the memory access instruction after the branch instruction which is different from that of the speculative LOAD2 such as the speculative or non-speculative LOAD3 in the above-described example, the judgement as the speculative entry cache miss is performed and the execution time of the memory access is concealed. In other words, for example, the branch instruction IID matching circuit outputs "0", and judgement as the speculative entry cache miss is performed. As a result, the data registration request is issued to the L2 cache controller, the memory access is executed by the L2 cache controller.

In the second example, by regarding the speculative LOAD_L and the speculative LOAD_M, which are instructions in the branch instruction BR1 in the same manner as the speculative LOAD2 in the above-described example, as not being the security attack target and causing the speculative entry cache hit to occur, it is possible to suppress the performance reduction.

L1 and L2 Cache Controllers of Multi-Core

Figure 16A:
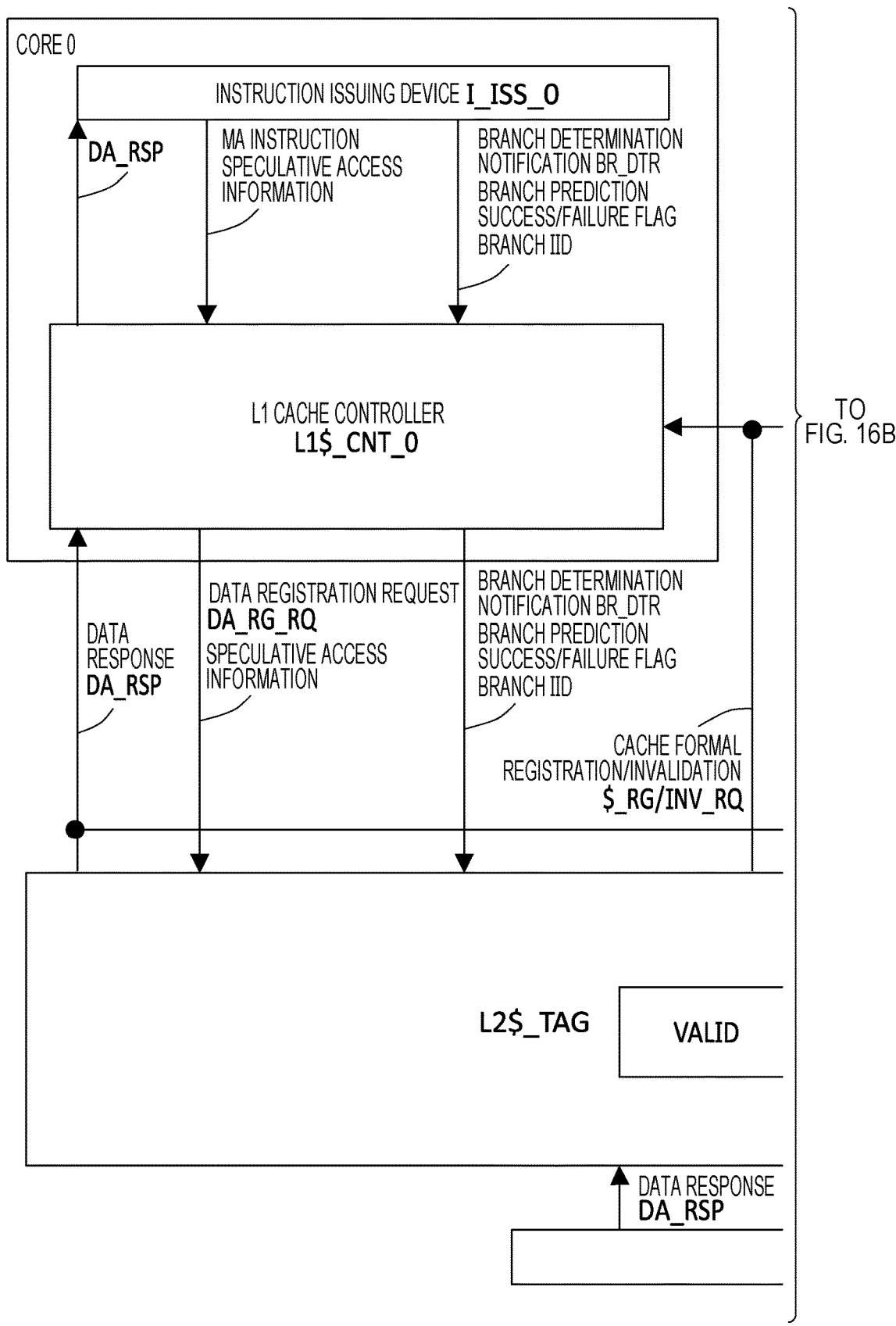
FIGS. 16A and 16B are diagrams illustrating a configuration of the L1 and L2 cache controllers in a case of a multi-core.
Figure 16B:
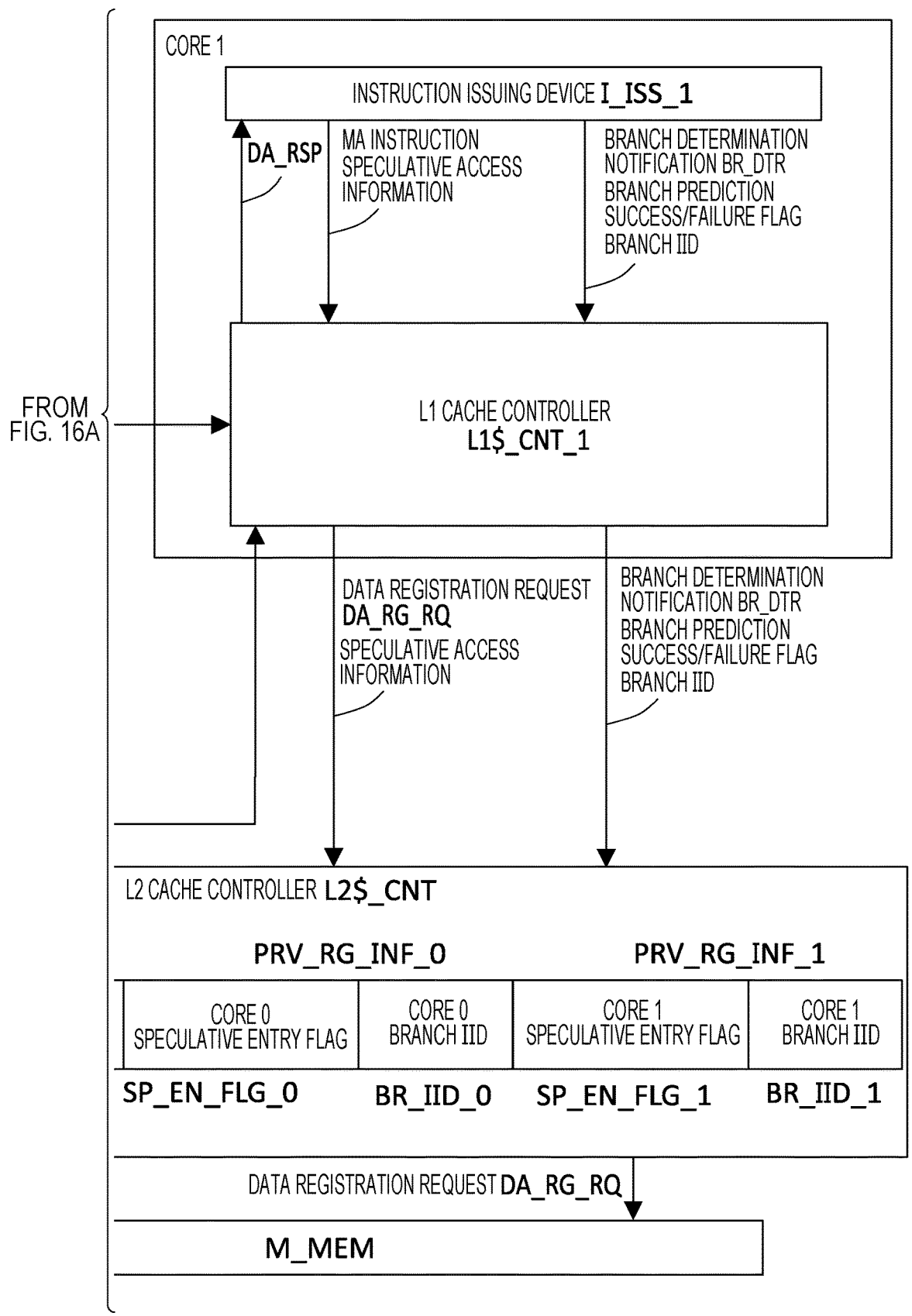

FIGS. 16A and 16B are diagrams illustrating a configuration of the L1 and L2 cache controllers in a case of a multi-core. A core 0 and a core 1 include L1 cache controllers L1$_CNT_0 and L1$_CNT_1, respectively, each having the configuration illustrated in FIGS. 6A and 6B. The L2 cache controller L2$_CNT shared by the core 0 and the core 1 corresponds to the controller of the last level cache. The L2 cache controller L2$_CNT also has a configuration illustrated in FIGS. 6A and 6B.

Note that the L2$_TAG of the L2 cache controller is different from the L1$_TAG of the L1 cache controller, stores provisional registration information SP_RG_INF_0 (the speculative entry flag SP_EN_FLG, the IID of the branch instruction) managed corresponding to the data registration request DA_RG_RQ from the core 0, and provisional registration information SP_RG_INF_1 managed corresponding to the data registration request DA_RG_RQ from the core 1. The L2$_TAG also stores, in the same manner as the normal cache tag, a valid bit VALID, a state bit of MESI control, an address, and the like.

Cache judgement based on the L2 cache tag in a case of the multi-core includes, in the same manner as the cache judgement based on the L1 cache tag, L2 cache hit judgement based on an address coincidence and L2 speculative entry cache hit judgement based on the provisional registration information (the speculative entry flag and the IID of the branch instruction) and the speculative data requested flag (FIG. 9) or the IID of the branch instruction (FIG. 15) in the fetch port. The L2 cache hit judgement is performed by an L2 cache hit judgement section, which is not illustrated in FIGS. 16A and 16B, the L2 speculative entry cache hit judgement is performed by an L2 speculative entry cache hit judgement section, which is not illustrated in FIGS. 16A and 16B. These are the same as the speculative entry cache hit judgement section in the L1 cache controller in FIGS. 6A and 6B.

The L2 speculative entry cache hit judgement based on the L2 cache tag in a case of the multi-core is, in principle, performed based on the provisional registration information SP_RG_INF corresponding to an issue source core which issues the data registration request in the L2 cache tag. In other words, for example, the speculative entry hit judgement at the L2 cache is the same judgement as the judgement performed based on the provisional registration information SP_RG_INF in the L1 cache tag at the L1 cache.

Figure 17:
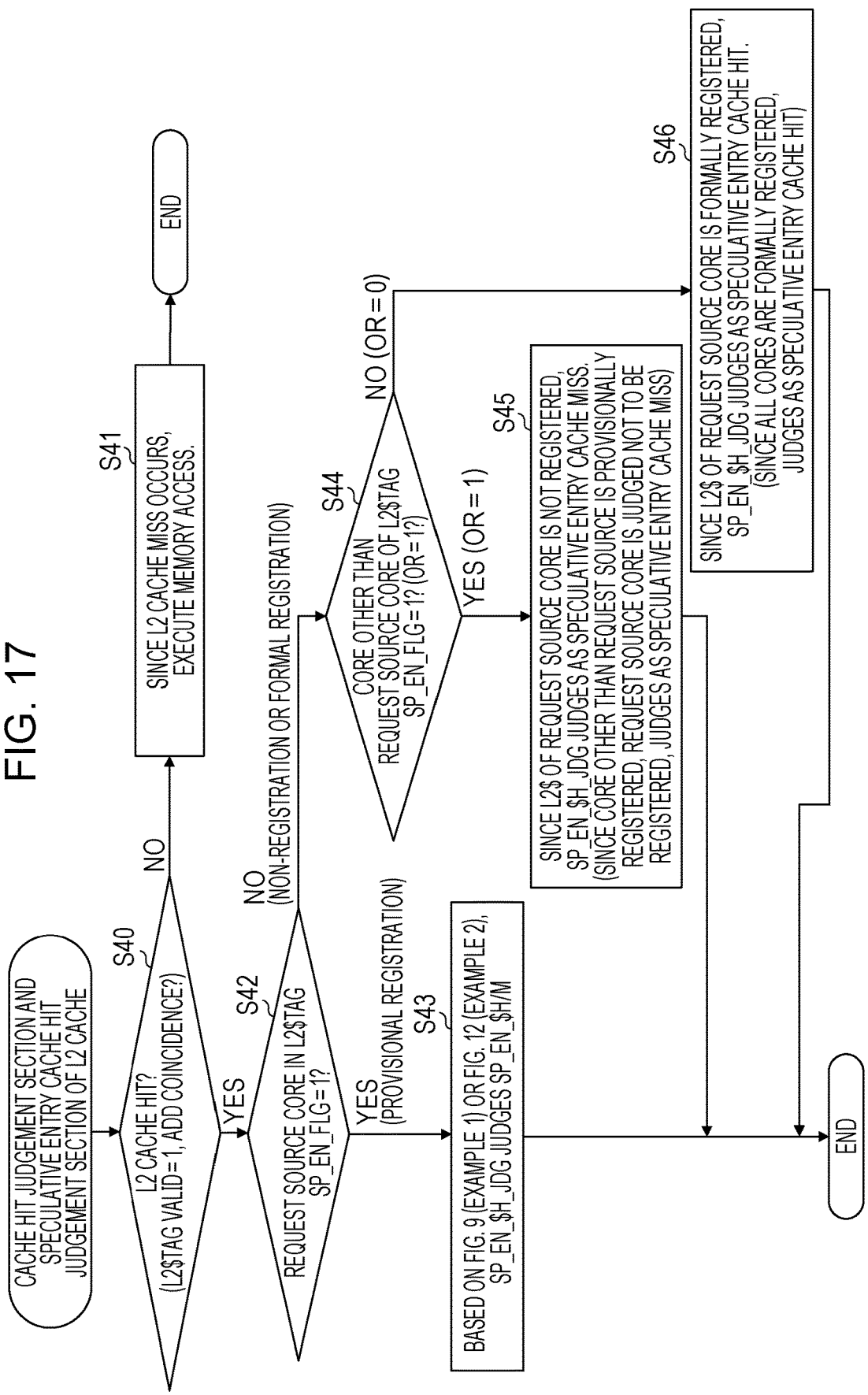
FIG. 17 is a flowchart of an L2 cache hit judgement and a speculative entry cache hit judgement at an L2 cache in the case of the multi-core.

FIG. 17 is a flowchart of the L2 cache hit judgement and the speculative entry cache hit judgement at the L2 cache in the case of the multi-core. According to this, in a case of the L2 cache hit judgement (the valid bit VALID of L2 cache tag L2$_TAG is valid "1" and the address coincidence) as a premise (YES in S40), the L2 speculative entry cache hit judgement section schematically performs the following judgement. In other words, for example, the L2 speculative entry cache hit judgement section judges, based on the information of the L2 cache tag, whether the issue source core of the data registration request does not register, provisionally registers, or formally registers the data in the L2 cache. (1) In a case where the data is provisionally registered, in the same manner as the L1 cache control in FIGS. 6A and 6B and FIGS. 8A and 8B, the speculative entry cache hit judgement is performed. (2) In a case where the data is formally registered, the judgement to be the L2 speculative entry cache hit is performed, the L2 cache hit judgement is followed. (3) In a case where the data is not registered, since the L2 cache hit judgement is based on provisional registration of other cores (the valid bit is "1"), the judgement to be the L2 speculative entry cache miss is performed. In this case, the L2 cache hit judgement is wrong as the judgement with respect to the issue source core.

Specifically, for example, in a case of the L2 cache hit judgement (YES in S40), the L2 speculative entry cache hit judgement section performs the following control.

(1) In a case where the speculative entry flag SP_EN_FLG corresponding to the issue source core is "1" which indicates the provisional registration (YES in S42), the L2 speculative entry cache hit judgement section performs the speculative entry cache judgement which is the same as that of the logic circuit in FIG. 9 or FIG. 12 (S43). In other words, for example, in the example in FIG. 9, in a case where the speculative data requested flag is "0" which indicates being non-requested, the judgement to be the speculative entry cache miss is performed, and in a case of "1" which indicates being requested, the judgement to be the speculative entry cache hit is performed. In the example in FIG. 12, based on whether the IID of the branch instruction of the fetch port and the IID of the branch instruction of the L2 cache tag coincide or do not coincide with each other, each judgement of the speculative entry cache hit or miss is made.

(2) In a case where the speculative entry flag SP_EN_FLG corresponding to the issue source core is "0" and it means the formal registration (NO in S42 and NO in S44), the L2 speculative entry cache hit judgement section judges to be the speculative entry cache hit in the same manner as the logic circuit in FIG. 9 or FIG. 12 (S46).

A point to be noted is that since the L2 cache tag includes a valid bit VALID which is common to all the cores, if the speculative entry flag SP_EN_FLG is configured of 1 bit, the non-registration, the provisional registration, and the formal registration may not be distinguished for each core. Particularly, for example, the speculative entry flag SP_EN_FLG is "0" in a case of the non-registration, and is also "0" in a case of the formal registration, and therefore the non-registration and the formal registration may not be distinguished. In the present embodiment, in a case where the formal registration in the L2 cache is performed at any core among the plurality of cores, the speculative entry flags SP_EN_FLG of all the cores are set to "0" so as to be able to distinguish the formal registration state from another state. This is because if the formal registration in the L2 cache is performed, the judgement of the speculative entry is not required and the hit judgement is performed in the L2 cache. This point will be described with reference to FIG. 18 later.

Accordingly, the case where the speculative entry flag SP_EN_FLG corresponding to the issue source core is "0" which indicates the formal registration means the case where the L2 cache tag includes the valid bit being valid "1" and the speculative entry flags of all the cores being "0" in the present embodiment. Whether or not the speculative entry flags of all the cores are "0" is judged by whether or not a logical sum (OR) of the speculative entry flags of all the cores is "0" (OR=0).

(3) In a case where the speculative entry flag SP_EN_FLG corresponding to the issue source core is "0" and it means the non-registration (NO in S42 and YES in S44), the L2 speculative entry cache hit judgement section judges to be the speculative entry cache miss (S45). In a case where the speculative entry flag corresponding to a core different from the issue source core is "1" which indicates the provisional registration, the L2 cache hit judgement is regarded to be performed based on the provisional registration of the core different from the issue source core, the issue source core receives judgement as the speculative entry cache miss, and is caused to execute the memory access. With this, the L2 cache hit judgement is denied.

A point to be noted is that, in the cache tag, normally, the judgement of the non-registration is performed by whether or not the valid bit is invalid "0". However, since the L2 cache tag includes the speculative entry flag for each core, when the provisional registration is performed for the data registration request from any core, the common valid bit is set to valid "1". Accordingly, whether or not the speculative entry is not registered for each core may not be judged only by the valid bit.

In the present embodiment, in a case where, in the L2 cache tag, the valid bit is valid "1", the speculative entry flag of the issue source core is "0", and the speculative entry flag of any core other than the issue source core is "1" of the provisional registration, the speculative entry flag of the issue source core is regarded as "0" of the non-registration, and judgement to be the speculative entry cache miss is made. This point will be also described with reference to FIG. 18 later.

In the judgement of the formal registration in (2) and the judgement of the non-registration in (3) described above, in a case where the non-registration, the provisional registration, and the formal registration are distinguishable with the speculative entry flag SP_EN_FLG, judgement may be made for distinguishing them with the speculative entry flag of the issue source core which issues the data registration request.

FIG. 18 is a diagram illustrating the speculative entry cache hit judgement in various types of L2 cache tag states in a case where a data registration request is issued by a memory access instruction speculatively executed from the core 1.

First, a state 0 (STATE_0) indicates that, since the valid bit is "0" and the speculative entry flag for each core is also "0", neither the provisional registration nor the formal registration of the data is performed from both the core 0 and the core 1. For the state 0, when the data registration request is issued from the core 1, the L2 cache hit judgement section judges as the L2 cache miss, and the memory access is executed.

In a next state 1 (STATE_1), the valid bit is "1", the speculative entry flag of the core 0 is "1" and "0xA" is registered in the branch instruction IID thereof, and the speculative entry flag of the core 1 is "1" and "0xB" is registered in the branch instruction IID thereof. This state 1 is a state in which, in a state 3 which will be described later, the core 1 provisionally registers the data in the L2 cache by the speculative LOAD2. In a case where the data registration request is issued by the speculative LOAD3 from the core 1 in this state 1, the L2 cache hit judgement is made in the L2 cache, the speculative entry cache hit judgement section makes, by step S43 in FIG. 17, hit judgement or miss judgement with the logic circuit in FIG. 9 or FIG. 12.

In the state 2 (STATE_2), the valid bit is "1", the speculative entry flag of the core 0 is "0" and an invalid state is registered in the branch instruction IID thereof, and the speculative entry flag of the core 1 is "1" and "0xB" is registered in the branch instruction IID thereof. In this case, since the core 1 being the issue source has the provisional registration state, in the same manner as the state 1, by step S43 in FIG. 17, the speculative entry cache hit judgement is made.

In the state 3 (STATE_3), the valid bit is "1", the speculative entry flag of the core 0 is "1" and "0xA" is registered in the branch instruction IID thereof, and the speculative entry flag of the core 1 is "0" and the branch instruction IID thereof includes invalid information. This is a state in which the core 0 provisionally registers the data in the L2 cache by the speculative LOAD2 from the state 0. In a case where the data registration request is issued by the speculative LOAD3 from the core 1 in this state 3, since the L2 cache is in a non-registration state with respect to the core 1, the speculative entry cache hit judgement in the L2 cache becomes miss judgement by step S45 in FIG. 17. In other words, for example, a result that the L2 cache hit judgement is denied is derived.

In a state 4 (STATE_4), the valid bit is "1", the speculative entry flags of the core 0 and the core 1 are both "0" and the branch instruction IIDs thereof each include the invalid information. This state 4 corresponds to a state in which, in the state 1 (STATE_1), the formal registration is performed by the data registration request from any core (for example, the core 1) and the speculative entry flag of the core 1 is set to "0".

In this case, if only the speculative entry flag of the core 1 is set to "0", the same state as the L2 cache tag in the state 3 is obtained. In order to distinguish from the non-registration in the state 3 (STATE_3), the speculative entry flags of the core 0 and the core 1 are both set to "0", a combination with the valid bit "1" makes it possible to recognize as the formal registration. The state 4 also corresponds to the formal registration state in which, in the state 3 (STATE_3), the speculative entry flag is set to "0" by the data registration request from the core 1. In the state 4, since the L2 cache is in the formal registration state, the speculative entry cache hit judgement section makes the hit judgement by step S46 in FIG. 17.

The formal registration is performed in the L2 cache, the speculative entry cache hit judgement with respect to the provisional registration is not required, there is no problem even if the speculative entry flags for all the cores are set to "0".

Processing Example A of L1 and L2 Caches of Multi-Core

Figure 19:
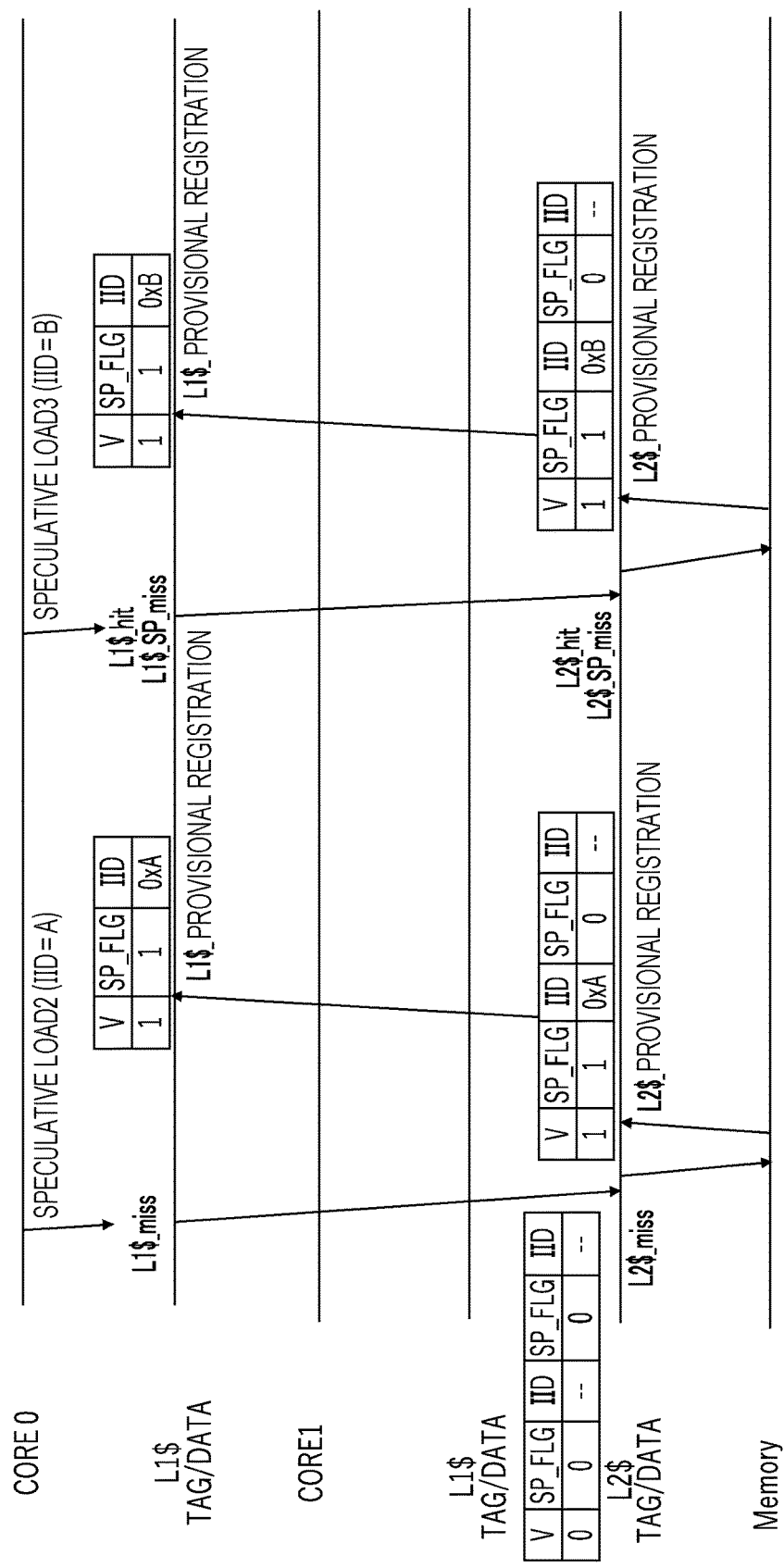
FIG. 19 is a diagram illustrating a sequence of a processing example A at L1 and L2 caches in the case of the multi-core.

FIG. 19 is a diagram illustrating a sequence of a processing example A in the L1 and L2 caches in the case of the multi-core. In this example A, first, after flushing (entirely invalidating) the cache, the core 0 executes the speculative LOAD2, and the provisional registration in the L1 and L2 caches at the core 0 is performed. The core 0 then executes the speculative LOAD3 for the same address, and the provisional registration in the L1 and L2 caches of the core 0 is performed.

In this case, since the cache is flushed, in response to the issue of the speculative LOAD2 of the core 0, the cache miss occurs in the L1 cache (L1$_miss), the data registration request is issued to the L2 cache, and the cache miss occurs in the L2 cache as well (L2$_miss). After accessing the memory, provisional registration (SP_EN_FLG=1, IID=0xA) is performed in the core 0 of the L2 cache tag, provisional registration (SP_EN_FLG=1, IID=0xA) is performed in the L1 cache tag of the core 0.

Next, in response to issue of the speculative LOAD3 of the core 1, the L1 cache hit occurs, but the L1 speculative entry cache miss (L1$_SP_miss) is generated, and the data registration request is issued to the L2 cache. In the L2 cache, since the speculative entry flag of the core 0 of the L2 cache tag is "1" of the provisional registration, the L2 speculative entry cache miss (L2$_SP_miss) is generated, and the memory access is executed. Thereafter, the provisional registration (SP_EN_FLG=1, IID=0xB) is performed in the core 0 of the L2 cache tag, the provisional registration (SP_EN_FLG=1, IID=0xB) is performed in the L1 cache tag of the core 0.

This example describes processing in which the IID of the branch instruction of the L2 cache tag is updated to 0xB.

Processing Example B of L1 and L2 Caches of Multi-Core

Figure 20:
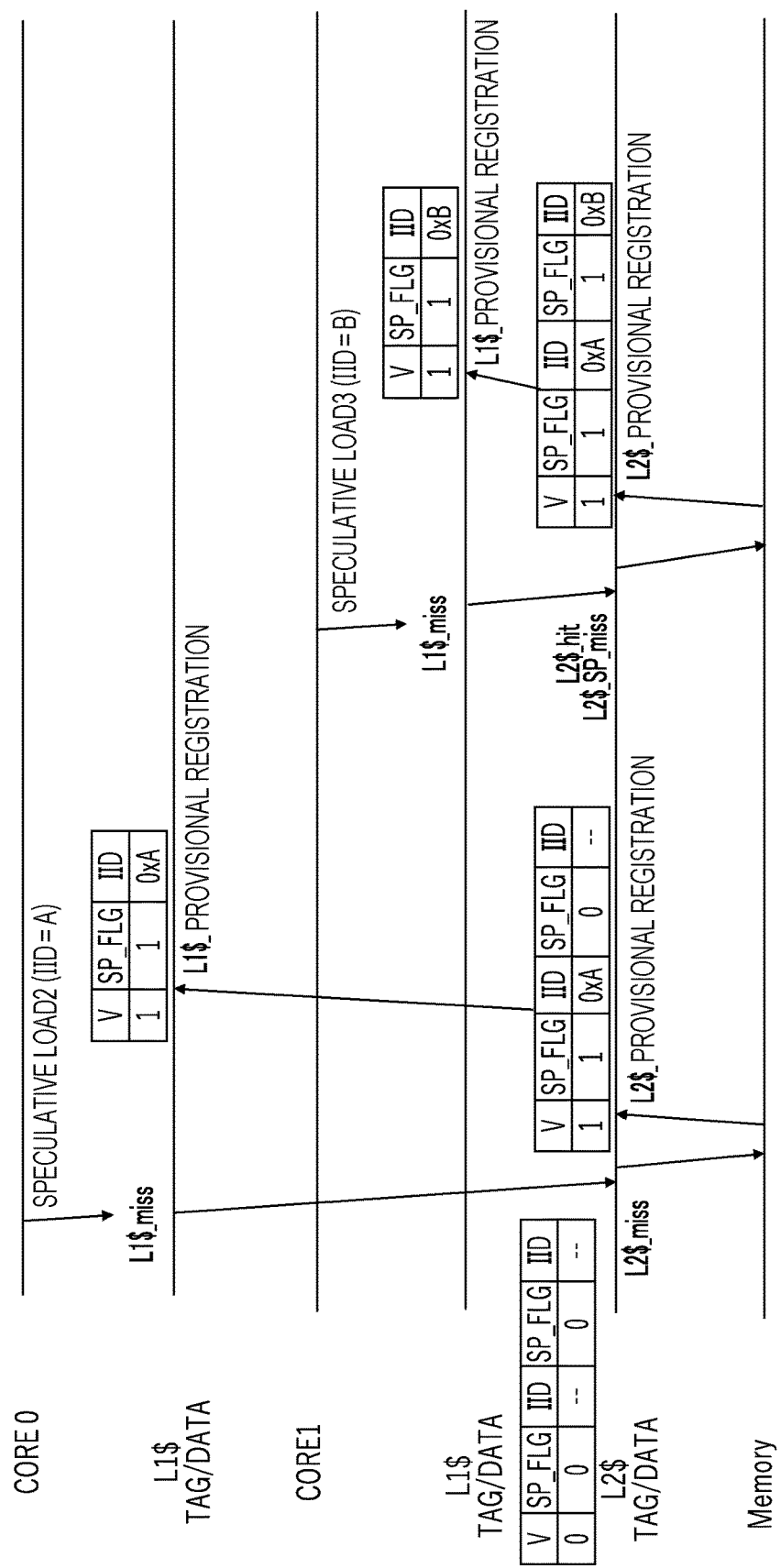
FIG. 20 is a diagram illustrating a sequence of a processing example B at the L1 and L2 caches in the case of the multi-core.

FIG. 20 is a diagram illustrating a sequence of a processing example B in the L1 and L2 caches in the case of the multi-core. In this example, first, after flushing (entirely invalidating) the cache, the core 0 executes the speculative LOAD2, and the provisional registration in the L1 and L2 caches at the core 0 is performed. The core 1 then executes the speculative LOAD3 for the same address, and the provisional registration in the L1 and L2 caches of the core 1 is performed.

The processing for the issue of the speculative LOAD2 of the core 0 is the same as the processing A in FIG. 19. Thereafter, in response to the issue of the speculative LOAD3 of the core 1, the L1 cache miss occurs, and the data registration request is issued to the L2 cache. Although the L2 cache hit (L2$_hit) occurs in the L2 cache, since the speculative entry flag of the core 1 of the L2 cache tag is "0", a logical sum (OR) of the speculative entry flags SP_EN_FLG of all the cores is judged. Since the logical sum OR is "1", judgement of non-registration is made for the core 1. Based thereon, the L2 speculative entry cache miss (L2$_SP_miss) occurs, and the memory access is executed. Thereafter, the provisional registration (SP_EN_FLG=1, IID=0xB) is performed in the core 1 of the L2 cache tag, the provisional registration (SP_EN_FLG=1, IID=0xB) is performed in the L1 cache tag of the core 1.

Processing Example C-1 of L1 and L2 Caches of Multi-Core

Figure 21:
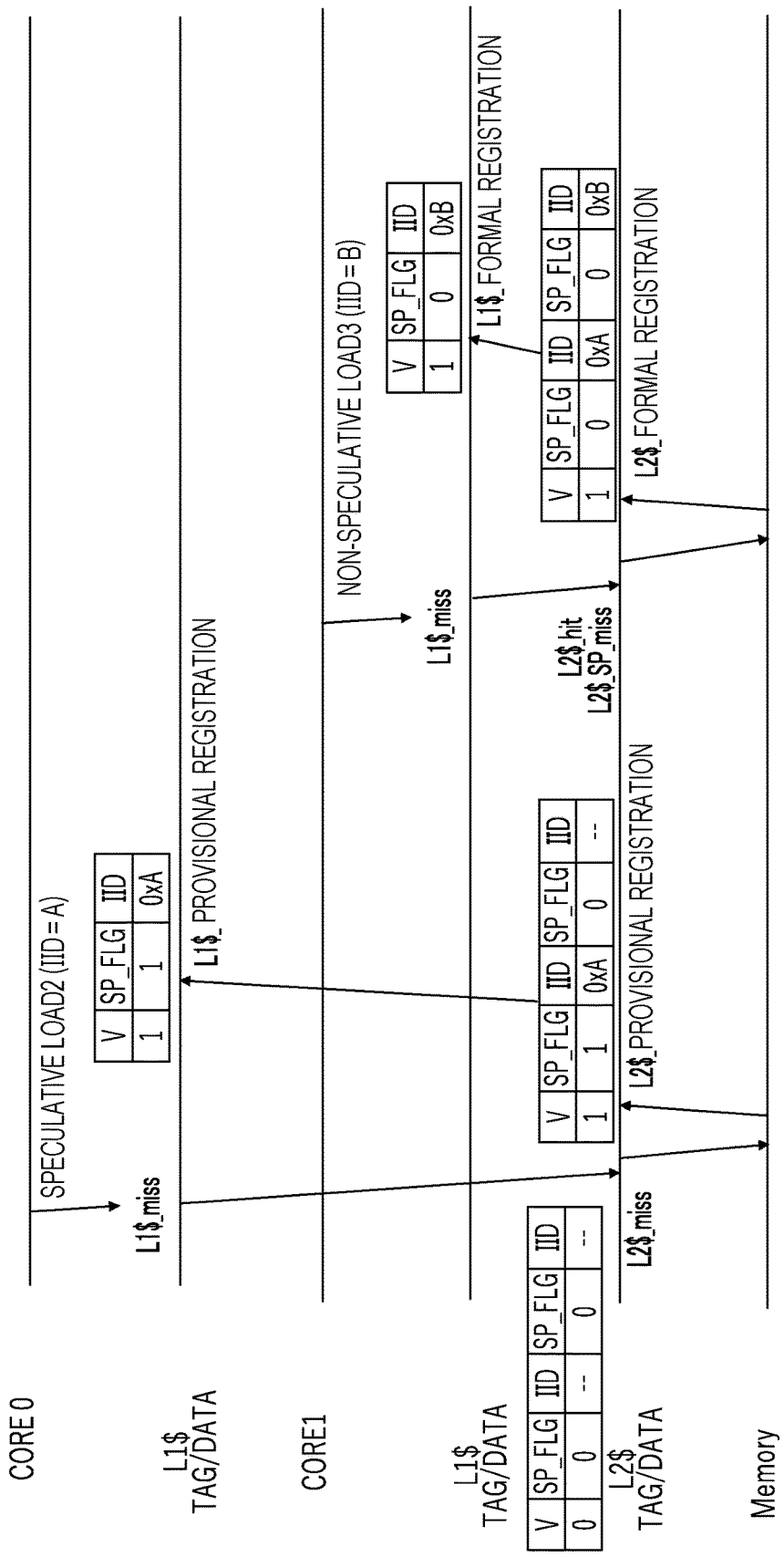
FIG. 21 is a diagram illustrating a sequence of a processing example C-1 at the L1 and L2 caches in the case of the multi-core.

FIG. 21 is a diagram illustrating a sequence of a processing example C-1 at the L1 and L2 caches in the case of the multi-core. In this example, first, after flushing (entirely invalidating) the cache, the core 0 executes the speculative LOAD2, and the provisional registration in the L1 and L2 caches at the core 0 is performed. The core 1 then executes the non-speculative LOAD3 for the same address, and the formal registration in the L1 and L2 caches of the core 1 is performed.

The processing for the issue of the speculative LOAD2 of the core 0 is the same as the processing A in FIG. 19. Thereafter, in response to the issue of the non-speculative LOAD3 of the core 1, the L1 cache miss occurs, and the data registration request is issued to the L2 cache. Although the L2 cache hit (L2$_hit) occurs in the L2 cache, since the speculative entry flag of the core 1 of the L2 cache tag is "0", a logical sum (OR) of the speculative entry flags SP_EN_FLG of all the cores is judged. Since the logical sum OR is "1", judgement of non-registration is made for the core 1. Based thereon, the L2 speculative entry cache miss (L2$_SP_miss) occurs, and the memory access is executed. Thereafter, the formal registration (SP_EN_FLG=0, IID=0xB) is performed in the core 1 of the L2 cache tag, the formal registration (SP_EN_FLG=0, IID=0xB) is performed in the L1 cache tag of the core 1. The formal registration (SP_EN_FLG=0, IID=0xA) is also performed in the core 0 of the L2 cache tag. This makes the L2 cache the formal registration state.

Processing Example C-2 of L1 and L2 Caches of Multi-Core

Figure 22:
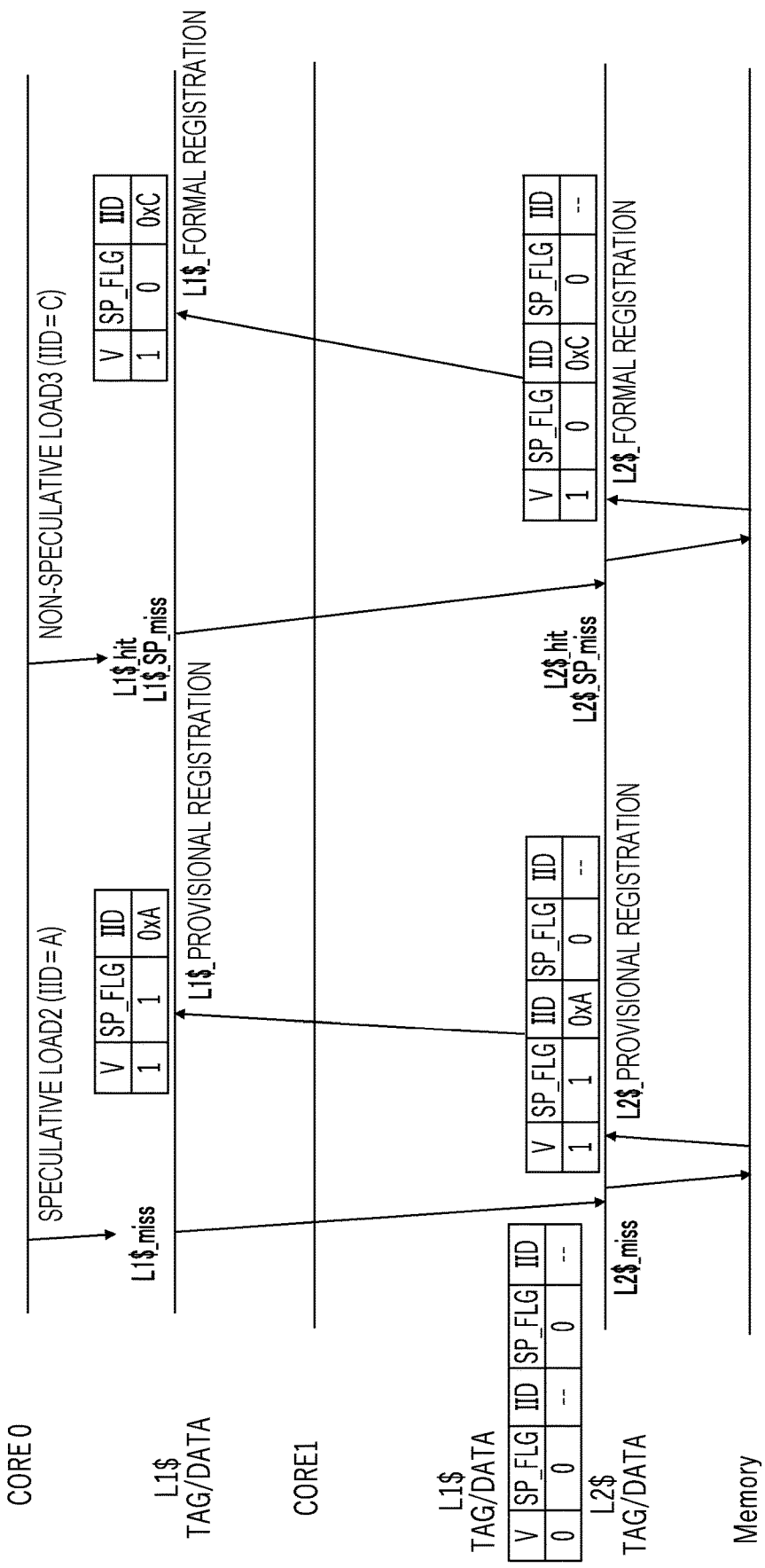
FIG. 22 is a diagram illustrating a sequence of a processing example C-2 at the L1 and L2 caches in the case of the multi-core.

FIG. 22 is a diagram illustrating a sequence of a processing example C-2 at the L1 and L2 caches in the case of the multi-core. In this example, first, after flushing (entirely invalidating) the cache, the core 0 executes the speculative LOAD2, and the provisional registration in the L1 and L2 caches at the core 0 is performed. The core 0 then executes the non-speculative LOAD3 (branch instruction IID=0xC) for the same address as that of the speculative LOAD2, and the formal registration in the L1 and L2 caches of the core 0 is performed.

The processing for the issue of the speculative LOAD2 of the core 0 is the same as the processing A in FIG. 19. In response to the issue of the non-speculative LOAD3 of the core 0 thereafter, the L1 cache hit (L1$_hit) occurs. Since the speculative entry flag of the L1 tag is "1", the L1 speculative entry cache miss (L1$_SO_miss) occurs. With this, the data registration request is issued to the L2 cache. In the L2 cache, the L2 cache hit (L2$_hit) occurs. Since the speculative entry flag of the core 0 of the L2 cache tag is "1" of the provisional registration, by the processing of S43 in FIG. 17, the L2 speculative entry cache miss (L2$_SP_miss) occurs, and the memory access is executed. Thereafter, the formal registration (SP_EN_FLG=0, IID=0xC) is performed in the core 0 of the L2 cache tag, the formal registration (SP_EN_FLG=0, IID=0xC) is performed in the L1 cache tag of the core 0. The formal registration (SP_EN_FLG=0) is also performed in the core 1 of the L2 cache tag. This makes the L2 cache the formal registration state.

Processing Example D of L1 and L2 Caches of Multi-Core

Figure 23:
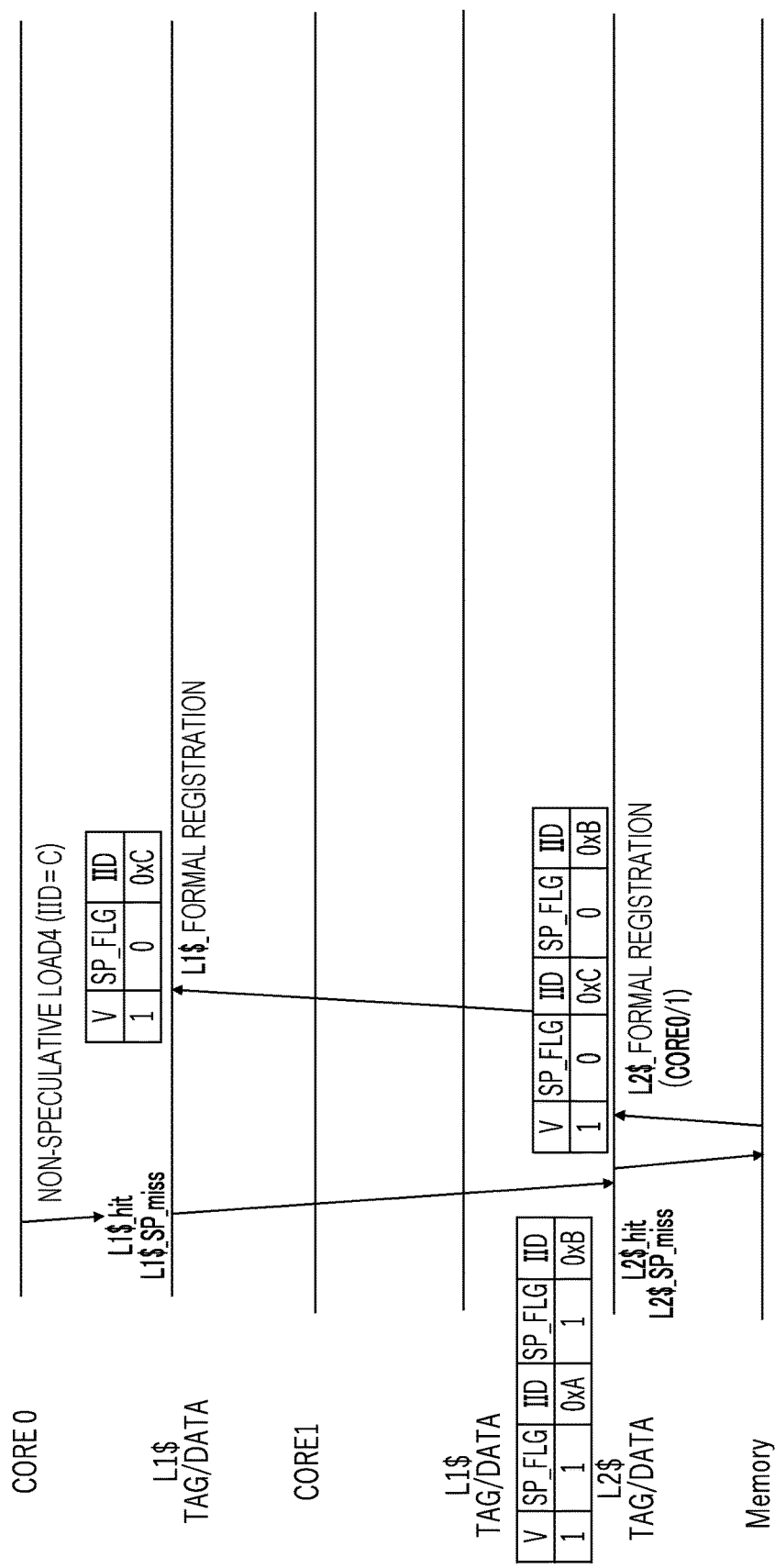
FIG. 23 is a diagram illustrating a sequence of a processing example D at the L1 and L2 caches in the case of the multi-core.

FIG. 23 is a diagram illustrating a sequence of a processing example D at the L1 and L2 caches in the case of the multi-core. In this example, after the processing B in FIG. 20, the core 0 executes the non-speculative LOAD3 (IID=0xC) for the same address as the processing B, and the formal registration in the L1 and L2 caches of the core 0 is performed.

In an end state in FIG. 20, in response to the issue of the non-speculative LOAD3 of the core 0, the L1 cache hit (L1$_hit) occurs. Since the speculative entry flag of the L1 tag is "1" of the provisional registration, judgement as the L1 speculative entry cache miss (L1$_SP_miss) is made. With this, the data registration request is issued to the L2 cache. Although the L2 cache hit (L2$_hit) occurs in the L2 cache, since the speculative entry flag of the core 0 of the L2 cache tag is "1" of the provisional registration, the L2 speculative entry cache miss (L2$_SP_miss) occurs. With this, the memory access is executed. Thereafter, the formal registration (SP_EN_FLG=0) is performed in the core 0 of the L2 cache tag, the formal registration (SP_EN_FLG=0, IID=0xC) is performed in the L1 cache tag of the core 0. The formal registration (SP_EN_FLG=0, IID=0xB) is also performed in the core 1 of the L2 cache tag. This makes the L2 cache the formal registration state.

Branch Determination Processing of Multi-Core

Figure 24:
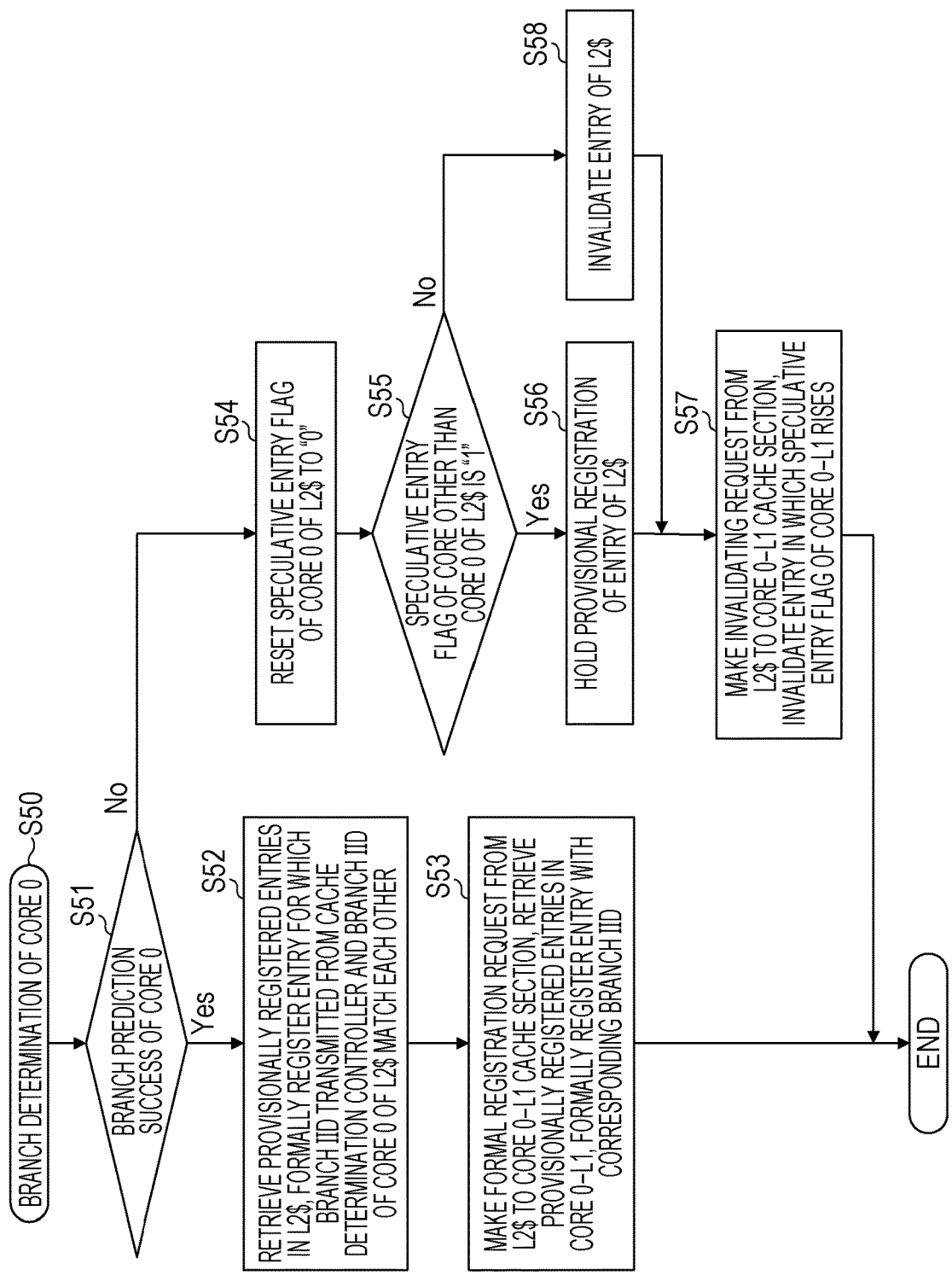
FIG. 24 is a flowchart of a branch determination processing in the case of the multi-core.

FIG. 24 is a flowchart of a branch determination processing in the case of the multi-core. The branch determination notification BR_DTR for notifying of branch prediction of a branch instruction transmitted from the RSBR of the instruction issuing device I_ISS of the core 0 being determined is transmitted from the cache determination controller CA_DTR_CNT (see FIGS. 6A and 6B) of the L1 cache controller L1$_CNT_0 of the core 0 to the cache determination controller of the L2 cache controller L2$_CNT (S50). To the branch determination notification BR_DTR, a branch prediction success/failure flag and the IID of the branch instruction are added.

When the branch prediction is successful (YES in S51), the L2 cache controller retrieves entries provisionally registered in the L2 cache tag using the IID of the branch instruction added to the branch determination notification BR_DTR, and changes registration of an entry in the provisional registration of the core 0 in the L2 cache tag having a branch instruction IID matching the branch instruction IID to the formal registration (S52). Specifically, for example, the IID of the core 0 of the L2 cache tag which matches the branch instruction IID of the branch determination notification is detected, and the speculative entry flags of all the cores of the entry being matched are reset to "0" to change to the formal registration state.

The cache determination controller of the L2 cache controller issues a cache formal registration request CA_RG_RQ to the cache controller of the L1 cache controller of the core 0. The branch instruction IID is also add to the cache formal registration request. In response to the cache formal registration request, an L1 cache determination portion of the core 0 retrieves entries provisionally registered in the L1 cache tag, and changes the registration of the entry in the provisional registration for which the IID of the branch instruction attached to the cache formal registration request and the IID of the branch instruction in the L1 cache tag match each other to the formal registration (S53). Specifically, for example, the matching speculative entry flag of the entry is changed to "0".

When the branch prediction is a failure (NO in S51), the cache determination controller of the L2 cache controller resets the speculative entry flag in a provisional registration state of the core 0 in the L2 cache tag to "0" to change the state to a non-registration state (S54). By resetting the speculative entry flag, when a logical sum (OR) of the speculative entry flags of all the cores in the L2 cache tag becomes "0" (NO in S55), the non-registration state is obtained in each of all the cores. A valid bit of the entry in which all the cores in the L2 cache tag have the non-registration state is set to "0" to make the entry invalid (S58). With this, the state 3 (STATE_3) in FIG. 18 is changed to the state 0 (STATE_0) after the branch determination.

By resetting the above-described speculative entry flag, in a case where the logical sum (OR) of the speculative entry flags of all the cores in the L2 cache tag is still "1" (YES in S55), since there is a core which is still provisionally registered, the provisional registration state of the entry is held (S56). With this, the state 1 (STATE_1) in FIG. 18 is changed to the state 2 (STATE_2) after the branch determination.

The cache determination controller of the L2 cache controller issues a cache invalidating request CA_INVL_RQ to the cache controller of the L1 cache controller of the core 0. In response to this cache invalidating request, the L1 cache determination portion in the core 0 retrieves entries provisionally registered in the L1 cache tag, invalidates the entries in the provisional registration, and also resets the speculative entry flag to "0" (S57).

As described above, according to the present embodiment, when access to the main memory for the memory access instruction speculatively executed occurs and data read from the memory are registered in the cache memory, the provisional registration information of the provisional registration state is added to the normal tag information and registered in the cache tag. When the memory access instruction or a request is then sent into the cache entry in the provisional registration state, even in a case of a cache hit, the memory access is executed by the speculative entry cache miss, and the cache latency is concealed. This makes it possible to reduce security vulnerability of the processor.

In the above-described embodiment, the instruction issuing device (i.e., the instruction issuer), the L1 cache controller, the L2 cache controller, the memory access controller, the instruction fetch address generator, and the cache determination controller may each be configured of a circuit. These circuits may include a field-programmable gate array (FPGA) and/or an integrated circuit (IC).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus comprising:
an instruction issuer circuit configured to issue an instruction; and
a cache including
a cache data memory and a cache tag including a plurality of cache entries, and
a cache controller configured to perform cache hit judgement, in response to a memory access instruction issued from the instruction issuer circuit, based on an address of the memory access instruction and configured to issue a memory access request to a memory in a case where the cache hit judgement is a cache miss,
wherein the cache controller registers,
in response to a speculative first memory access instruction which is issued from the instruction issuer circuit and to which a speculative access flag indicating speculative execution and an identification (IID) of a branch instruction are added, when issuing the memory access request, data obtained by the memory access request in the cache data memory, and registers, based on the speculative execution of the speculative access flag, provisional registration information of a provisional registration state indicating that cache registration is performed by execution of a speculative memory access instruction in the cache tag, and
in response to a second memory access instruction issued after the speculative first memory access instruction, to a same address as an address of the speculative first memory access instruction, in a case where the provisional registration information of an entry in the cache tag for which a cache hit occurs has the provisional registration state, judges as a speculative entry cache miss and issues the memory access request.

2. The arithmetic processing apparatus according to claim 1, wherein the cache controller outputs
a data response to which the data in the cache data memory are added in a case where the cache hit judgement is a cache hit, and
based on the memory access request issued in the case where the provisional registration information of the entry in the cache tag for which the cache hit occurs has the provisional registration state, after registering data read from the memory in the cache data memory and the cache tag, in response to the second memory access instruction inputted again, judges as a speculative entry cache hit and outputs the data response.

3. The arithmetic processing apparatus according to claim 1, wherein the cache controller performs, in the case where the provisional registration information of the entry in the cache tag for which the cache hit occurs has the provisional registration state, when the second memory access instruction is non-speculatively executed, cache registration of the data obtained by the memory access request, by changing the provisional registration information of the entry in the cache tag for which the cache hit occurs to a formal registration state.

4. The arithmetic processing apparatus according to claim 1, wherein the cache controller outputs
the data response to which the data in the cache data memory are added in the case where the cache hit judgement is a cache hit,
the provisional registration information including a speculative entry flag indicating the provisional registration state and an identification of a branch instruction for the speculative first memory access instruction, and
in the case where the provisional registration information of the entry in the cache tag for which the cache hit occurs has the provisional registration state, in a case where the identification of the branch instruction of the entry for which the cache hit occurs and an identification of a branch instruction for the second memory access instruction coincide with each other, judges as a speculative entry cache hit and outputs the data response, and in a case of inconsistency, judges as the speculative entry cache miss and issues the memory access request.

5. The arithmetic processing apparatus according to claim 1, wherein the cache controller changes, when branch determination for a branch instruction which coincides with the identification of the branch instruction added to the speculative first memory access instruction is made, the provisional registration information of the provisional registration state in the cache tag to a formal registration state in a case of a branch prediction success, and invalidates the entry including the provisional registration information of the provisional registration state in the cache tag in a case of a branch prediction failure.

6. The arithmetic processing apparatus according to claim 1, further comprising a second level cache provided between the cache and the memory,
wherein a second level cache controller of the second level cache registers
the data obtained by the memory access request issued in response to the speculative first memory access instruction in a second level cache data memory and registers the provisional registration information of the provisional registration state in a second level cache tag, and
in response to the memory access request issued in response to the second memory access instruction, judges as the speculative entry cache miss and issues the memory access request to the memory.

7. The arithmetic processing apparatus according to claim 6, comprising a plurality of cores each including the instruction issuer circuit and the cache of a first level,
wherein the second level cache is commonly provided for the plurality of cores and to which the memory access request is issued from each of the plurality of cores,
the second level cache controller of the second level cache,
in response to the memory access request issued from a first core among the plurality of cores, in a case where the memory access request is issued in accordance with the speculative first memory access instruction, registers the provisional registration information for the first core in the second level cache tag,
in response to the memory access request issued from a second core among the plurality of cores, in a case where the memory access request is issued in accordance with the speculative first memory access instruction, registers the provisional registration information for the second core in the second level cache tag, and
in response to the memory access request issued based on the second memory access instruction, in a case where the provisional registration information for an issue source core of the memory access request has the provisional registration state, judges as the speculative entry cache miss and issues the memory access request to the memory.

8. The arithmetic processing apparatus according to claim 7, wherein the second level cache tag stores a valid bit indicating that an entry is in a registration state, the second cache controller, in response to a memory access request issued from the first core based on the second memory access instruction, in a case where a cache hit occurs based on the second cache tag, in a case where the provisional registration information for the first core has a non-provisional registration state, and when the provisional registration state for the second core is a provisional registration state, judges as a speculative entry cache miss, and when the provisional registration state for the second core is a non-provisional registration state, judges as a speculative entry cache hit.

9. The arithmetic processing apparatus according to claim 8, wherein when the branch determination is made by the branch prediction failure, the second cache controller invalidates, when resetting the provisional registration information of the provisional registration state for the branch determination source core of the second level cache tag to a non-provisional registration state, in a case where provisional registration information for a core different from the branch determination source core also has the provisional registration state, the entry of the second level cache tag.

10. The arithmetic processing apparatus according to claim 7, wherein when the branch determination is made by a branch prediction failure, the second level cache controller resets provisional registration information of a provisional registration state for a branch determination source core of the second level cache tag to a non-provisional registration state, the L1 cache controller of the branch determination source core invalidates an entry storing provisional registration information of a provisional registration state of the L1 cache tag, and when a branch determination is made by a branch prediction success, the second level cache controller changes an entry in which the provisional registration information for the branch determination source core of the second level cache tag has the provisional registration state and an identification of a branch instruction which coincides with an identification of the branch instruction for which the branch determination is made is stored, to a formal registration state, and the L1 cache controller of the branch determination source core changes an entry in which the provisional registration information of the L1 cache tag of the branch determination source core has a provisional registration state and the identification of the branch instruction which coincides with the identification of the branch instruction for which the branch determination is made is stored, to the formal registration state.

11. A cache memory control process of an arithmetic processing apparatus executed by a cache memory controller, the method comprising:

perform cache hit judgement based on an address of a memory access instruction;

issue a memory access request to a memory in a case where the cache hit judgement is a cache miss;

registering, in response to a speculative first memory access instruction to which a speculative access flag indicating speculative execution and an identification (IID) of a branch instruction are added, data obtained by the memory access request in the cache data memory;

registering, based on the speculative execution of the speculative access flag, provisional registration information of a provisional registration state indicating that cache registration is performed by execution of a speculative memory access instruction in the cache tag; and in response to a second memory access instruction issued after the speculative first memory access instruction, to a same address as an address of the speculative first memory access instruction, in a case where the provisional registration information of an entry in the cache tag for which a cache hit occurs has the provisional registration state, judging as a speculative entry cache miss and issuing the memory access request.

12. An arithmetic processing apparatus comprising:

an instruction issuer circuit configured to issue an instruction; and a cache including a cache data memory storing a cache tag including a plurality of cache entries, and a cache controller configured to perform cache hit judgement based on an address of a memory access instruction issued from the instruction issuer circuit, and issue a memory access request to a memory in a case where the cache hit judgement is a cache miss, the cache controller registers, registers in response to a speculative first memory access instruction which is issued from the instruction issuer circuit and to which a speculative access flag indicating speculative execution and an identification (IID) of a branch instruction are added, data obtained by the memory access request in the cache data memory, registers, based on the speculative execution of the speculative access flag, provisional registration information of a provisional registration state indicating that cache registration is performed by execution of a speculative memory access instruction in the cache tag, and in response to a second memory access instruction issued after the speculative first memory access instruction, to a same address as an address of the speculative first memory access instruction, in a case where the provisional registration information of an entry in the cache tag for which a cache hit occurs has the provisional registration state, judges the second memory access instruction as a speculative entry cache miss and issues the memory access request.

* * * * *